US009495908B2

(12) United States Patent
Zhou et al.

(10) Patent No.: US 9,495,908 B2
(45) Date of Patent: Nov. 15, 2016

(54) PIXEL CIRCUIT, ORGANIC ELECTROLUMINESCENT DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Quanguo Zhou, Beijing (CN); Xiaojing Qi, Beijing (CN)

(73) Assignees: BOE Technology Group Co., Ltd., Beijing (CN); CHENGDU BOE Optoelectronics Technology Co., Ltd., Chengdu, Sichuan (CN)

( * ) Notice: Subject to any disclaimer, the term of this patent is extended or adjusted under 35 U.S.C. 154(b) by 0 days.

(21) Appl. No.: 14/418,620

(22) PCT Filed: May 15, 2014

(86) PCT No.: PCT/CN2014/077616
§ 371 (c)(1),
(2) Date: Jan. 30, 2015

(87) PCT Pub. No.: WO2015/014147
PCT Pub. Date: Feb. 5, 2015

(65) Prior Publication Data
US 2015/0325171 A1 Nov. 12, 2015

(30) Foreign Application Priority Data

Jul. 31, 2013 (CN) .......................... 2013 1 0329847

(51) Int. Cl.
G09G 3/3233 (2016.01)
G09G 3/32 (2016.01)
(52) U.S. Cl.
CPC .............. G09G 3/3233 (2013.01); G09G 3/32 (2013.01); G09G 3/3291 (2013.01); G09G 2300/0852 (2013.01); G09G 2300/0861 (2013.01); G09G 2354/00 (2013.01)
(58) Field of Classification Search
CPC ................. G09G 3/3233; G09G 3/32; G09G 2300/0852; G09G 2300/0861; G09G 2354/00; G09G 3/3291
See application file for complete search history.

(56) References Cited

U.S. PATENT DOCUMENTS 8,072,396 B2 12/2011 Kitazawa et al.
2007/0040772 A1 2/2007 Kim
(Continued)

FOREIGN PATENT DOCUMENTS

CN 101093641 A 12/2007
CN 103135846 A 6/2013
(Continued)

OTHER PUBLICATIONS

Written Opinion of the International Searching Authority of PCT/CN2014/077616 in Chinese with English translation, mailed Aug. 29, 2014.
(Continued)

Primary Examiner — William Boddie
Assistant Examiner — Saifeldin Elnafia
(74) Attorney, Agent, or Firm — Collard & Roe, P.C.

(57) ABSTRACT

A pixel circuit, an organic electroluminescent display panel and a display device are provided. The pixel circuit includes a drive sub-module (1), a data write sub-module (2), a touch detection sub-module (3) having a photosensitive device and a light-emitting control sub-module (4) having a luminous device. Under the control of the reset signal terminal (Reset), the scan signal terminal (Scan) and the data signal terminal (Data), a data signal is transmitted to the first terminal (1a) of the drive sub-module (1) by the data write sub-module (2). Under the control of the touch control signal terminal (Select), the touch detection sub-module (3) controls output of a touch detection signal from the drive sub-module (1) to the touch signal read terminal, the touch detection signal being decreased as the light intensity irradiated onto the photosensitive device is increased, so as to realize a touch function. Under the control of the light-emitting control signal terminal (EM), the light-emitting control sub-module (4) controls the drive sub-module to drive the luminous device (1) to give off light, so as to realize a display function. Touch and display functions are integrated in the pixel circuit, so that the production cost involved in arranging a display driving circuit and a touch circuit separately can be saved.

17 Claims, 9 Drawing Sheets

(56) References Cited

U.S. PATENT DOCUMENTS

| | | | |
|---|---|---|---|
| 2007/0273619 A1* | 11/2007 | Kitazawa | G09G 3/3233 345/76 |
| 2011/0109532 A1 | 5/2011 | Choi | |
| 2013/0009942 A1 | 1/2013 | Lee et al. | |
| 2014/0168127 A1 | 6/2014 | Yang | |
| 2015/0103037 A1* | 4/2015 | Wu | G06F 3/0412 345/174 |

FOREIGN PATENT DOCUMENTS

| | | | |
|---|---|---|---|
| CN | 103208255 A | 7/2013 | |
| CN | 103218972 A | 7/2013 | |
| CN | 103413523 A | 11/2013 | |
| CN | 203366705 U | 12/2013 | |
| EP | 2 328 178 A2 | 6/2011 | |
| JP | 2010-085526 A | 4/2010 | |

OTHER PUBLICATIONS

Chinese Office Action of Chinese Application No. 201310329847.X, mailed Jan. 6, 2015 with English translation.
English Translation of the International Search Report of PCT/CN2014/077616, mailed Aug. 24, 2014.
International Search Report and Written Opinion of the International Searching Authority with Notice of Transmittal of the International Search Report and Written Opinion of PCT/CN2014/077616 in Chinese, mailed Aug. 29, 2014.

* cited by examiner

PIXEL CIRCUIT, ORGANIC ELECTROLUMINESCENT DISPLAY PANEL AND DISPLAY DEVICE

CROSS REFERENCE TO RELATED APPLICATIONS

This application is the National Stage of PCT/CN2014/077616 filed on May 15, 2014, which claims priority under 35 U.S.C. §119 of Chinese Application No. 201310329847.X filed on Jul. 31, 2013, the disclosure of which is incorporated by reference.

TECHNICAL FIELD

Embodiments of the present invention relate to a pixel circuit, an organic electroluminescent display panel and a display device.

BACKGROUND

As the display devices are developing in the direction of lightness and thinness, high resolution, intellectualization, and energy-saving, the use of Touch Screen Panels is wider and wider. Currently, an In Cell Touch Panel gets the favors of the major panel manufacturer, and this is because that touch components are embedded inside a display panel, so that the overall thickness of the module can be decreased, and the production cost of the touch panel can be greatly reduced as well. While an Organic Light Emitting Diode (OLED) display panel attracts a lot of attentions by virtue of its advantages of low power consumption, high brightness, low cost, wide viewing angle, fast response speed and so on.

In existing in-cell touch panel OLED display panels, circuits used to realize the display drive and the touch drive for them are separately designed in general. Namely, a set of circuits is useful for realization of a touch function, and another set of circuits is useful for realization of a display driving function of the OLED. But, separate arrangement of a display drive circuit and a touch circuit will suffer in the drawbacks of higher production cost, heavier display screen and being thicker.

SUMMARY

According to an embodiment of the present invention, there is provided a pixel circuit, comprising: a drive sub-module, a data write sub-module, a touch detection sub-module having a photosensitive device, and a light-emitting control sub-module having a luminous device, wherein, a first terminal of the drive sub-module is connected to a first terminal of the data write sub-module and a first terminal of the touch detection sub-module, respectively, a second terminal of the drive sub-module is connected to a second terminal of the data write sub-module, a second terminal of the touch detection sub-module and a first reference signal terminal, respectively, a third terminal of the drive sub-module is connected to a third terminal of the data write sub-module, a third terminal of the touch detection sub-module and a first terminal of the light-emitting control sub-module, respectively;

a fourth terminal of the data write sub-module is connected to a reset signal terminal, a fifth terminal of the data write sub-module is connected to a scan signal terminal, a sixth terminal of the data write sub-module is connected to a data signal terminal; under the control of the reset signal terminal, the scan signal terminal and the data signal terminal, a data signal is transmitted to the first terminal of the drive sub-module by the data write sub-module;

a fourth terminal of the touch detection sub-module is connected to a touch control signal terminal, a fifth terminal of the touch detection sub-module is connected to a touch signal read terminal; under the control of the touch control signal terminal, the touch detection sub-module controls output of a touch detection signal from the drive sub-module to the touch signal read terminal, the touch detection signal being decreased as the light intensity irradiated onto the photosensitive device is increased;

a second terminal of the light-emitting control sub-module is connected to a second reference signal terminal, a third terminal of the light-emitting control sub-module is connected to a light-emitting control signal terminal; under the control of the light-emitting control signal terminal, the light-emitting control sub-module controls the drive sub-module to drive the luminous device to give off light.

As regards a pixel circuit provided by embodiments of the invention, under the control of a reset signal terminal, a scan signal terminal and a data signal terminal, a data signal is transmitted to a first terminal of the drive sub-module by the data write sub-module; under the control of a touch control signal terminal, the touch detection sub-module controls output of a touch detection signal from the drive sub-module to a touch signal read terminal, wherein the touch detection signal is decreased as the light intensity irradiated onto the photosensitive device is increased, so as to achieve a touch detecting function; under the control of a light-emitting control signal terminal, the light-emitting control sub-module takes control of the drive sub-module's driving the luminous device to give off light, so as to achieve a display driving function. Touch and display functions are integrated in the pixel circuit, so that the production cost involved in arranging a display driving circuit and a touch circuit separately can be saved, and thickness of the display panel can be thinned as well.

In an example, the first terminal and the second terminal of the drive sub-module are signal input terminals, and the third terminal of the drive sub-module is a signal output terminal;

the first terminal of the data write sub-module is a signal output terminal, the second terminal, the third terminal, the fourth terminal, the fifth terminal and the sixth terminal, of the data write sub-module are signal input terminals;

one of the first terminal and the second terminal of the touch detection sub-module is a signal input terminal, the other one of the first terminal and the second terminal of the touch detection sub-module is a signal output terminal; the third terminal and the fourth terminal of the touch detection sub-module are signal input terminals, the fifth terminal of the touch detection sub-module is a signal output terminal;

one of the first terminal and the second terminal of the light-emitting control sub-module is a signal input terminal, the other one of the first terminal and the second terminal of the light-emitting control sub-module is a signal output terminal; the third terminal of the light-emitting control sub-module is a signal input terminal.

In an example, the drive sub-module comprises a drive transistor, wherein, a gate electrode of which is the first terminal of the drive sub-module, a source electrode of which is the second terminal of the drive sub-module, and a drain electrode of which is the third terminal of the drive sub-module.

In an example, in the event that the drive transistor is an N-type transistor, the voltage of the first reference signal terminal is a zero voltage or a negative voltage, and the voltage of the second reference signal terminal is a positive voltage; in the event that the drive transistor is a P-type transistor, the voltage of the first reference signal terminal is a positive voltage, and the voltage of the second reference signal terminal is a negative voltage or a zero voltage.

In an example, the data write sub-module comprises a first switch transistor, a second switch transistor, a first capacitor and a second capacitor, wherein, a gate electrode of the first switch transistor is connected to the reset signal terminal, a source electrode of the first switch transistor is connected to the third terminal of the drive sub-module, and a drain electrode of the first switch transistor is connected to the first terminal of the drive sub-module, a first end of the first capacitor and a first end of the second capacitor, respectively;

a gate electrode of the second switch transistor is connected to the scan signal terminal, a source electrode of the second switch transistor is connected to the data signal terminal, and a drain electrode of the second switch transistor is connected to a second end of the first capacitor;

a second end of the second capacitor is connected to the first reference signal terminal, the second terminal of the drive sub-module and the second terminal of the touch detection sub-module, respectively.

In an example, the first switch transistor is an N-type transistor or a P-type transistor; the second switch transistor is an N-type transistor or a P-type transistor.

In an example, the touch detection sub-module comprises a third switch transistor and a fourth switch transistor, wherein, a gate electrode of the third switch transistor is connected to the touch control signal terminal, a drain electrode of the third switch transistor is connected to a first end of the photosensitive device;

one of a source electrode of the third switch transistor and a second terminal of the photosensitive device is connected to the first terminal of the drive sub-module, and the other one of the source electrode of the third switch transistor and the second terminal of the photosensitive device is connected to the first reference signal terminal;

a gate electrode of the fourth switch transistor is connected to the touch control signal terminal, a source electrode of the fourth switch transistor is connected to the third terminal of the drive sub-module, and a drain electrode of the fourth switch transistor is connected to the touch signal read terminal.

In an example, the third switch transistor and the fourth switch transistor are N-type transistors; or, the third switch transistor and the fourth switch transistor are P-type transistors.

In an example, the light-emitting control sub-module comprises a fifth switch transistor; wherein, a gate electrode of the fifth switch transistor is connected to the light-emitting control signal terminal, and a drain electrode of the fifth switch transistor is connected to a first terminal of the luminous device;

one of a source electrode of the fifth switch transistor and a second terminal of the luminous device is connected to the third terminal of the drive sub-module, and the other one of the source electrode of the fifth switch transistor and the second terminal of the luminous device is connected to the second reference signal terminal.

In an example, the fifth switch transistor is an N-type transistor or a P-type transistor.

An organic electroluminescent display panel provided by an embodiment of the invention comprises the pixel circuit provided by embodiments of the invention.

A display device provided by an embodiment of the invention comprises the organic electroluminescent display panel provided by embodiments of the invention.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Figure 1:
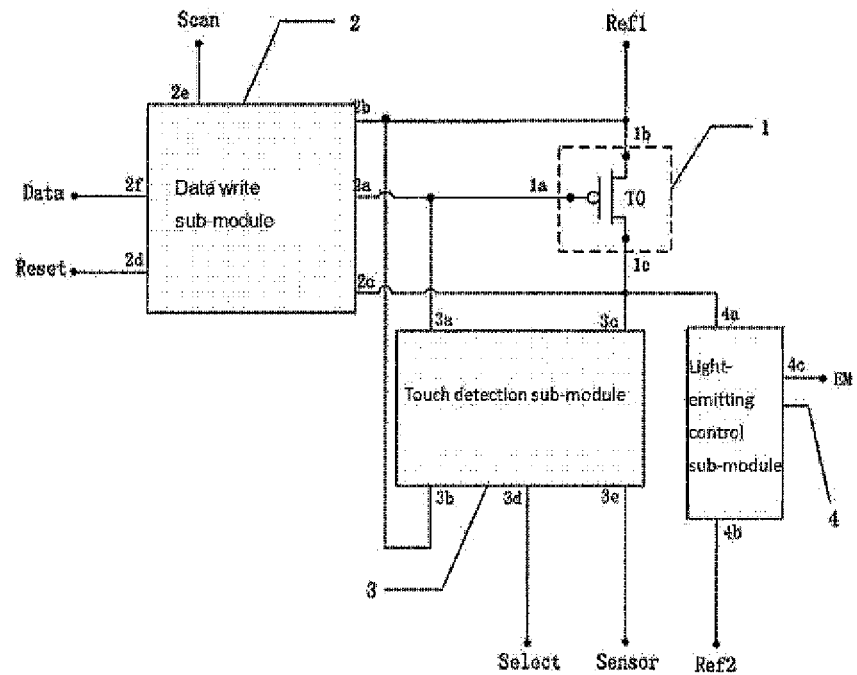
FIG. 1 is a structurally schematic view illustrating a pixel circuit provided by an embodiment of the invention.

A pixel circuit provided by an embodiment of the present invention, as illustrated in FIG. 1, comprises a drive sub-module 1, a data write sub-module 2, a touch detection sub-module 3 having a photosensitive device, and a light-emitting control sub-module 4 having a luminous device (the photosensitive device and the luminous device are not illustrated in FIG. 1).

A first terminal 1a of the drive sub-module 1 is connected to a first terminal 2a of the data write sub-module 2 and a first terminal 3a of the touch detection sub-module 3, respectively, a second terminal 1b of the drive sub-module 1 is connected to a second terminal 2b of the data write sub-module 2, a second terminal 3b of the touch detection sub-module 3 and a first reference signal terminal Ref1, respectively, a third terminal 1c of the drive sub-module 1 is connected to a third terminal 2c of the data write sub-module 2, a third terminal 3c of the touch detection sub-module 3 and a first terminal 4a of the light-emitting control sub-module 4, respectively.

A fourth terminal 2d of the data write sub-module 2 is connected to a reset signal terminal Reset, a fifth terminal 2e of the data write sub-module 2 is connected to a scan signal terminal Scan, a sixth terminal 2f of the data write sub-module 2 is connected to a data signal terminal Data; under the control of the reset signal terminal Reset, the scan signal terminal Scan and the data signal terminal Data, a data signal is transmitted to the first terminal 1a of the drive sub-module 1 by the data write sub-module 2.

A fourth terminal 3d of the touch detection sub-module 3 is connected to a touch control signal terminal Select, a fifth terminal 3e of the touch detection sub-module 3 is connected to a touch signal read terminal Sensor; under the control of the touch control signal terminal Select, the touch detection sub-module 3 controls output of a touch detection signal from the drive sub-module 1 to the touch signal read terminal Sensor, the touch detection signal being decreased as the light intensity irradiated onto the photosensitive device is increased.

A second terminal 4b of the light-emitting control sub-module 4 is connected to a second reference signal terminal Ref2, a third terminal 4c of the light-emitting control sub-module 4 is connected to a light-emitting control signal terminal EM; under the control of the light-emitting control signal terminal EM, the light-emitting control sub-module 4 controls the drive sub-module to drive the luminous device to give off light.

As regards the above pixel circuit provided by embodiments of the invention, under the control of a reset signal terminal Reset, a scan signal terminal Scan and a data signal terminal Data, a data signal is transmitted to a first terminal 1a of the drive sub-module 1 by the data write sub-module 2; under the control of a touch control signal terminal Select, the touch detection sub-module 3 controls output of a touch detection signal from the drive sub-module 1 to a touch signal read terminal Sensor, wherein the touch detection signal is decreased as the light intensity irradiated onto the photosensitive device is increased, so as to achieve a touch detecting function; under the control of a light-emitting control signal terminal EM, the light-emitting control sub-module 4 controls the drive sub-module to drive the luminous device to give off light, so as to achieve a display driving function. Touch and display functions are integrated in the pixel circuit, so that the production cost involved in arranging a display drive circuit and a touch circuit separately can be saved, and thickness of the display panel can be thinned as well.

For example, in the above pixel circuit provided by embodiments of the invention, the first terminal 1a and the second terminal 1b of the drive sub-module 1 are signal input terminals, and the third terminal 1c of the drive sub-module 1 is a signal output terminal;

the first terminal 2a of the data write sub-module 2 is a signal output terminal, and the second terminal 2b, the third terminal 2c, the fourth terminal 2d, the fifth terminal 2e and the sixth terminal 2f of the data write sub-module 2 are signal input terminals;

the first terminal 3a of the touch detection sub-module 3 is a signal input terminal, its second terminal 3b is a signal output terminal, or, the first terminal 3a of the touch detection sub-module 3 is a signal output terminal, its second terminal 3b is a signal input terminal; the third terminal 3c and the fourth terminal 3d of the touch detection sub-module 3 are signal input terminals, and the fifth terminal 3e of the touch detection sub-module 3 is a signal output terminal;

the first terminal 4a of the light-emitting control sub-module 4 is a signal input terminal, its second terminal 4b is a signal output terminal, or, the first terminal 4a of the light-emitting control sub-module 4 is a signal output terminal, its second terminal 4b is a signal input terminal; and the third terminal 4c of the light-emitting control sub-module 4 is a signal input terminal.

For example, in the above pixel circuit provided by embodiments of the invention, the signal of the first reference signal terminal Ref1 is usually a direct current signal, namely, the first reference signal terminal Ref1 is connected to a direct current signal source; the signal of the second reference signal terminal Ref2 is usually a direct current signal as well, namely, the second reference signal terminal Ref2 is connected to a direct current signal source.

The drive control sub-module 1 in the above pixel circuit provided by embodiments of the invention, as illustrated in FIG. 1, may include a drive transistor T0.

A gate electrode of the drive transistor T0 is the first terminal 1a of the drive sub-module 1, a source electrode of the drive transistor T0 is the second terminal 1b of the drive sub-module 1, and a drain electrode of the drive transistor T0 is the third terminal 1c of the drive sub-module 1. Of course, the drive sub-module 1 may also be other structure with which the drive control function of it can be realized, and no limit will be set here.

It is to be noted that, for example, the drive transistor T0 may be an N-type transistor, and may also be a P-type transistor, and no limit will be set here. In order to ensure that the drive transistor T0 can work normally, upon the drive transistor T0 being an N-type transistor, its threshold voltage $V_{th}$ is positive, and the voltage of the first reference signal terminal Ref1 is a negative voltage or a zero voltage; upon the drive transistor T0 being a P-type transistor, its threshold voltage $V_{th}$ is negative, and the voltage of the first reference signal terminal Ref1 is a positive voltage, and the voltage of the second reference signal terminal Ref1 is a negative voltage or a zero voltage.

For example, the operation of the above pixel circuit provided by embodiments of the invention is divided into two periods: touch and display periods. When the above pixel circuit is in operation, it is possible that the operation at the touch period is executed firstly, and then the operation at the display period is executed. It may also be possible that the operation at the display period is executed firstly, and then the operation at the touch period is executed. No limit will be set here.

The working principle of the touch period and the display period of the above pixel circuit provided by embodiments of the invention will be introduced below briefly.

At the touch period, the operation of the above pixel circuit is specifically divided into three stages:

A first stage: an initialization stage, in which, initialization of the data write sub-module 2 is achieved by the pixel circuit. In this stage, the touch detection sub-module 3 and the light-emitting control sub-module 4 are in a turned-off state, and the data write sub-module 2 is reset under the control of the reset signal terminal Reset, the scan signal terminal Scan and the data signal terminal Data, so that an initial voltage value is input into the gate electrode of the drive transistor T0 by the first terminal 2a of the data write sub-module 2.

A second stage: a data write stage, in which, data write-in to a gate electrode of the drive transistor T0 is achieved by the pixel circuit. At this stage, the touch detection sub-module 3 and the light-emitting control sub-module 4 are in a turned-off state, the data write sub-module 2 is in a turned-on state under the control of the scan signal terminal Scan, and a data signal is applied to the first terminal 1a of the drive sub-module 1 by the data write sub-module 2.

A third stage: a touch detection stage, in which, the data write sub-module 2 and the light-emitting control sub-module 4 are in a turned-off state, the touch detection sub-module 3 is in a turned-on state, and the switched-on touch detection sub-module 3 takes control of output of a touch detection signal from the drive transistor T0 to the touch signal read terminal Sensor. The touch detection signal is decreased as the light intensity irradiated onto the photosensitive device is increased, so as to achieve detection of a touch.

At the display period, the operation of the above pixel circuit is specifically divided into three stages as well:

A first stage: an initialization stage, in which, initialization of the data write sub-module 2 is achieved by the pixel circuit. In this stage, the touch detection sub-module 3 and the light-emitting control sub-module 4 are in a turned-off state, and the data write sub-module 2 is reset under the control of the reset signal terminal Reset, so that an initial voltage value is input into the gate electrode of the drive transistor T0 by the first terminal 2a of the data write sub-module 2.

A second stage: a data write stage, in which, data write-in to a gate electrode of the drive transistor T0 is achieved by the pixel circuit. At this stage, the touch detection sub-module 3 and the light-emitting control sub-module 4 are in a turned-off state, the data write sub-module 2 is in a turned-on state under the control of the scan signal terminal Scan, and a data signal is transmitted to the first terminal 1a of the drive sub-module 1 by the data write sub-module 2.

A third stage: a light-emitting drive stage, in which, the data write sub-module 2 and the touch detection sub-module 3 are in a turned-off state, the light-emitting control sub-module 4 is in a turned-on state, the light-emitting control sub-module 4 having the luminous device is connected to a drain electrode of the drive transistor T0, and the light-emitting control sub-module 4 controls the drive transistor T0 to drive the luminous device to give off light, so as to achieve a display function.

Hereinafter, the concrete structure and the working principle of the data write sub-module 2, the touch detection sub-module 3 and the light-emitting control sub-module 4 in the above pixel circuit provided by embodiments of the invention will be described in detail.

For example, in the above pixel circuit provided by embodiments of the invention, the data write sub-module 2, as illustrated in FIG. 2a, FIG. 2b, FIG. 3a, FIG. 3b, FIG. 4a, FIG. 4b, FIG. 5a and FIG. 5b, may include a first switch transistor T1, a second switch transistor T2, a first capacitor Cst1 and a second capacitor Cst2.

A gate electrode of the first switch transistor T1 is connected to a reset signal terminal Reset, a source electrode of the first switch transistor T1 is connected to a third terminal 1c of the drive sub-module 1, and a drain electrode of the first switch transistor T1 is connected to a first terminal 1a of the drive sub-module, a first end x1 of the first capacitor Cst1 and a first end y1 of the second capacitor Cst2, respectively;

A gate electrode of the second switch transistor T2 is connected to a scan signal terminal Scan, a source electrode of the second switch transistor T2 is connected to a data signal terminal Data, and a drain electrode of the second switch transistor T2 is connected to a second end x2 of the first capacitor Cst1;

A second end y2 of the second capacitor Cst2 is connected to a first reference signal terminal Ref1, a second terminal 1b of the drive sub-module 1 and a second terminal 3b of the touch detection sub-module 3, respectively.

For example, the first switch transistor T1 may be an N-type transistor, as illustrated in FIG. 2a, FIG. 2b, FIG. 5a and FIG. 5b; and the first switch transistor T1 may also be a P-type transistor, as illustrated in FIG. 3a, FIG. 3b, FIG. 4a and FIG. 4b, no limit being set here. In the event that the first switch transistor T1 is an N-type transistor, when the signal of the reset signal terminal Reset is of high level, the first switch transistor T1 is in a turned-on state; in the event that the first switch transistor T1 is a P-type transistor, when the signal of the reset signal terminal Reset is of low level, the first switch transistor T1 is in a turned-on state.

For example, the second switch transistor T2 may be an N-type transistor, as illustrated in FIG. 2a, FIG. 2b, FIG. 5a and FIG. 5b; and the second switch transistor T2 may also be a P-type transistor, as illustrated in FIG. 3a, FIG. 3b, FIG. 4a and FIG. 4b, no limit being set here. In the event that the second switch transistor T2 is an N-type transistor, when the signal of the scan signal terminal Scan is of high level, the second switch transistor T2 is in a turned-on state; in the event that the second switch transistor T2 is a P-type transistor, when the signal of the scan signal terminal Scan is of low level, the second switch transistor T2 is in a turned-on state.

For example, in the above pixel circuit provided by embodiments of the invention, in order to ensure that the drive transistor T0 can work normally, when the drive transistor T0 is an N-type transistor, the signal to the data signal terminal Data at the data write period should be a high-level signal; when the drive transistor T0 is a P-type transistor, the signal to the data signal terminal Data at the data write period should be a low-level signal.

For example, in the above pixel circuit provided by embodiments of the invention, the touch detection sub-module 3, as illustrated in FIG. 2a, FIG. 2b, FIG. 3a, FIG. 3b, FIG. 4a, FIG. 4b, FIG. 5a and FIG. 5b, may further include a third switch transistor T3 and a fourth switch transistor T4.

A gate electrode of the third switch transistor T3 is connected to a touch control signal terminal Select, a drain electrode of the third switch transistor T3 is connected to a first terminal p1 of the photosensitive device;

A source electrode of the third switch transistor T3 is connected to a first terminal 1a of the drive sub-module 1, a second terminal p2 of the photosensitive device is connected to a first reference signal terminal Ref1, as illustrated in FIG. 2a, FIG. 3a, FIG. 4a and FIG. 5a; or, a source electrode of the third switch transistor T3 is connected to a first reference signal terminal Ref1, a second terminal p2 of the photosensitive device is connected to a first terminal 1a of the drive sub-module 1, as illustrated in FIG. 2b, FIG. 3b, FIG. 4b and FIG. 5b;

A gate electrode of the fourth switch transistor T4 is connected to a touch control signal terminal Select, a source electrode of the fourth switch transistor T4 is connected to a third terminal 1c of the drive sub-module 1, and a drain electrode of the fourth switch transistor T4 is connected to a touch signal read terminal Sensor.

For example, in the above pixel circuit provided by embodiments of the invention, as illustrated in FIG. 2a, FIG. 2b, FIG. 3a, FIG. 3b, FIG. 4a, FIG. 4b, FIG. 5a and FIG. 5b, the photosensitive device may specifically be a photodiode PD (Photo Diode), the device used for which is simple, so as to achieve convenience and low cost.

Figure 2A:
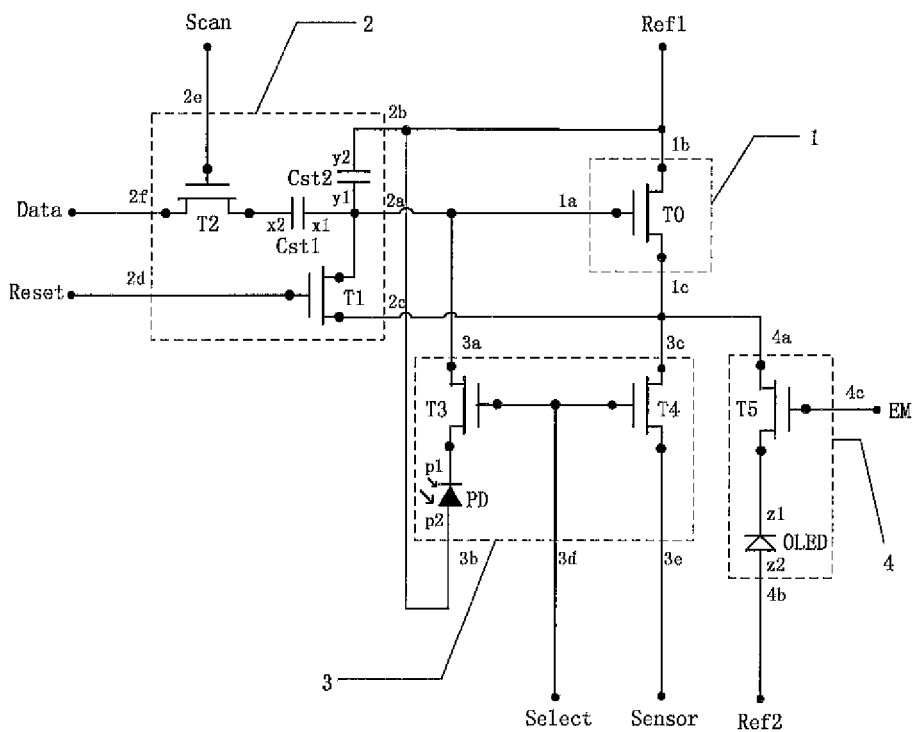
FIG. 2a is a first schematic view illustrating a concrete structure of a pixel circuit provided by an embodiment of the invention.
Figure 2B:
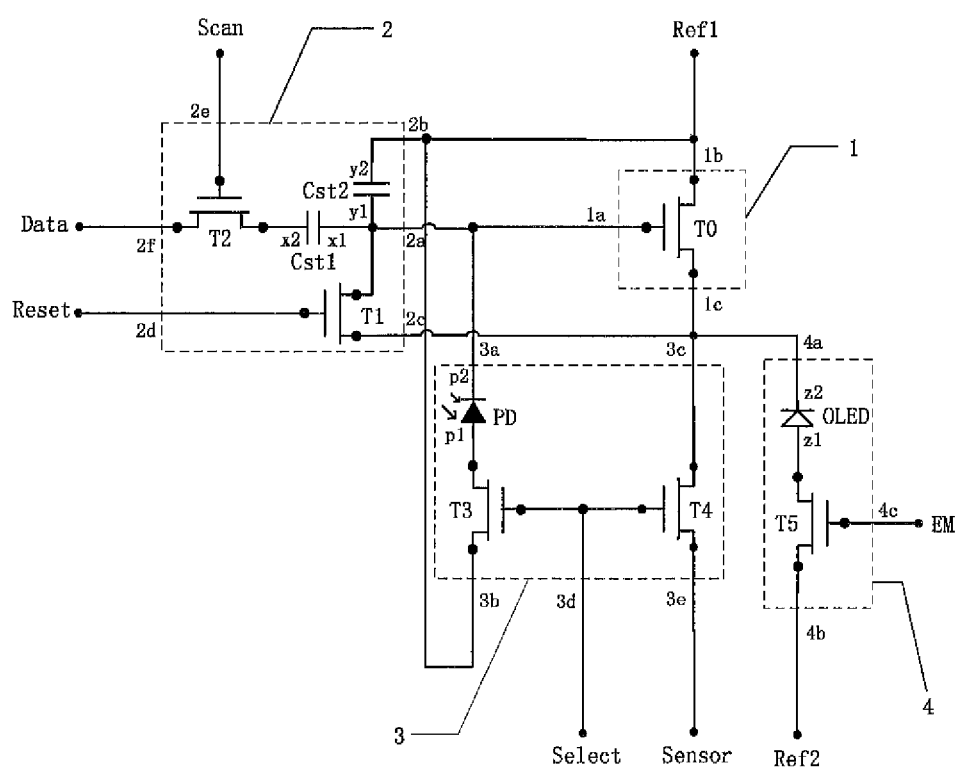
FIG. 2b is a second schematic view illustrating a concrete structure of a pixel circuit provided by an embodiment of the invention.
Figure 3A:
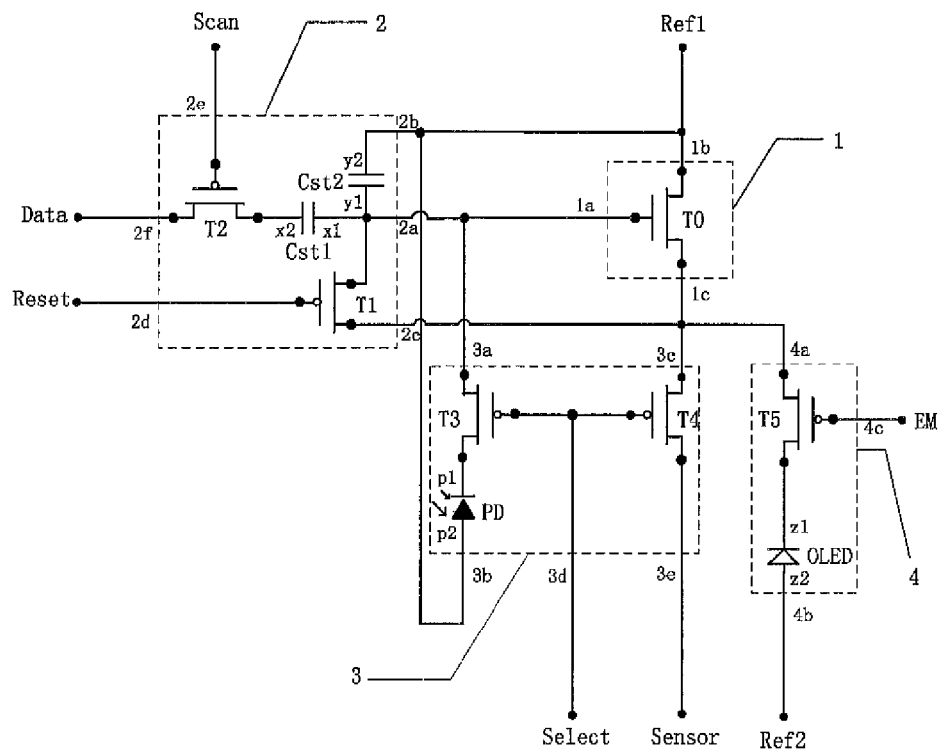
FIG. 3a is a third schematic view illustrating a concrete structure of a pixel circuit provided by an embodiment of the invention.
Figure 3B:
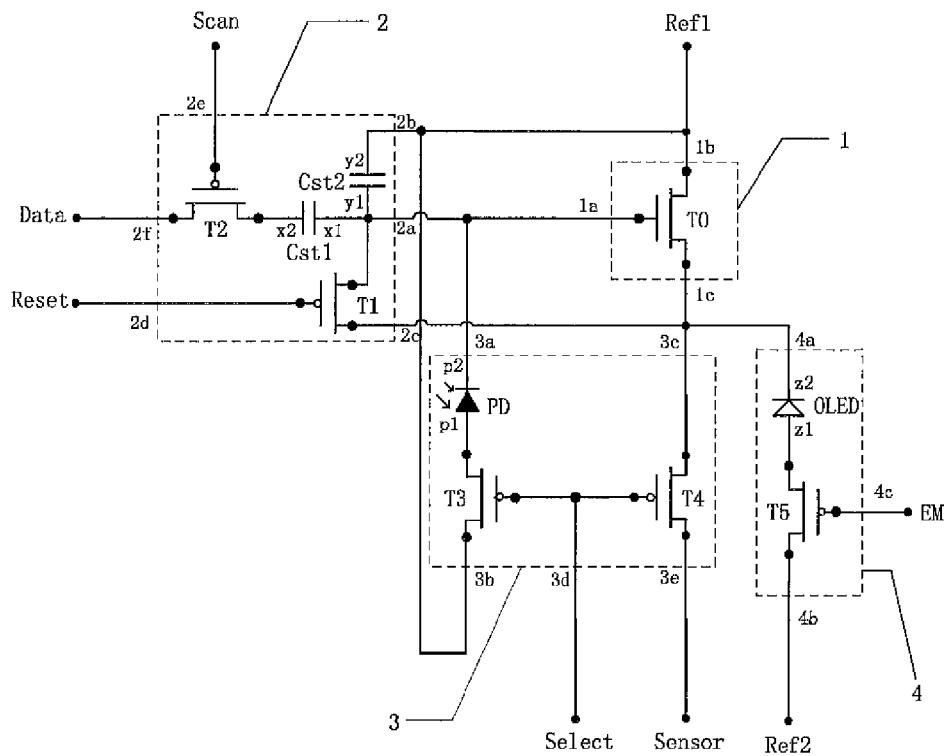
FIG. 3b is a fourth schematic view illustrating the concrete structure of a pixel circuit provided by an embodiment of the invention.
Figure 4A:
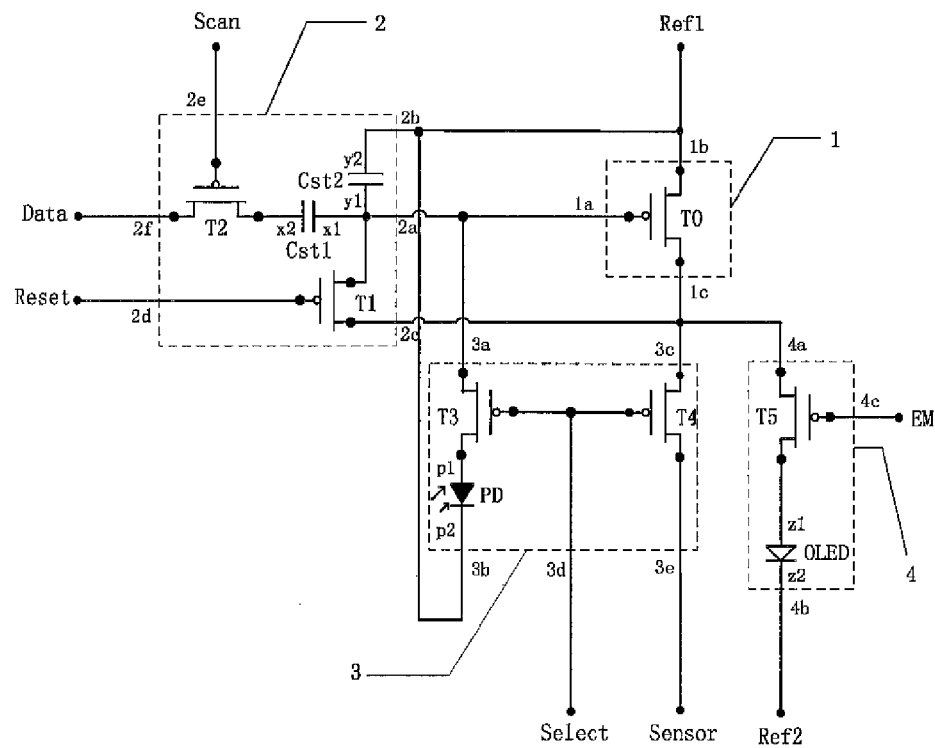
FIG. 4a is a fifth schematic view illustrating the concrete structure of a pixel circuit provided by an embodiment of the invention.
Figure 4B:
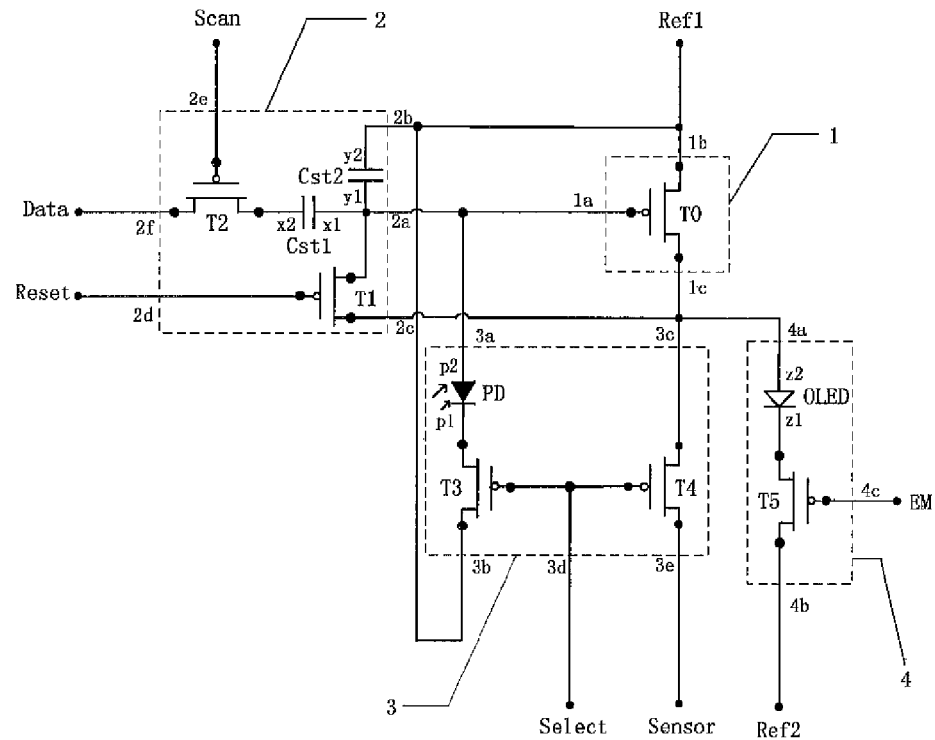
FIG. 4b is a sixth schematic view illustrating the concrete structure of a pixel circuit provided by an embodiment of the invention.
Figure 5A:
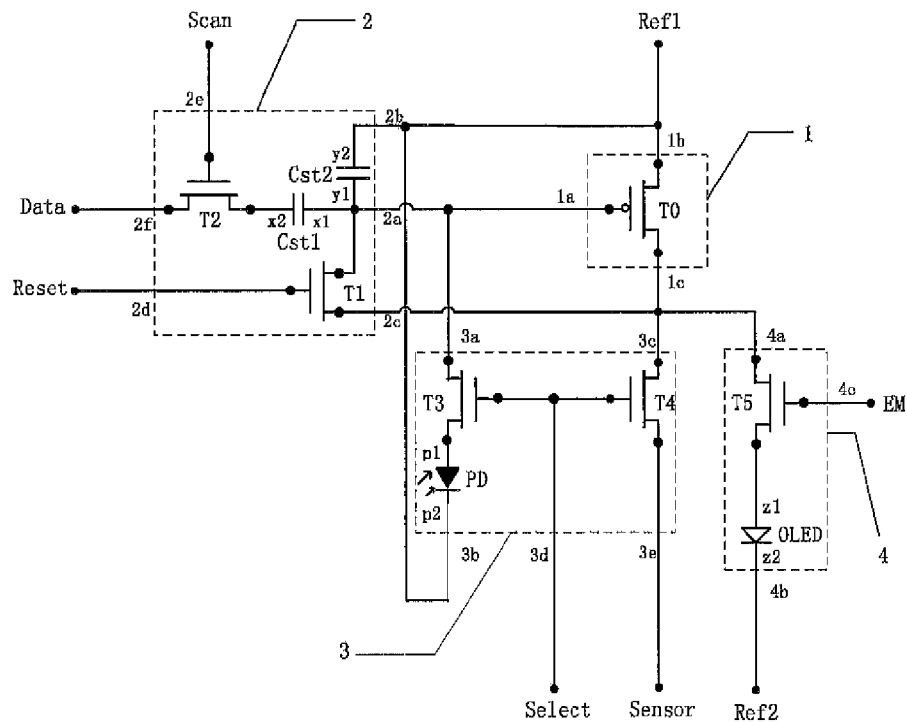
FIG. 5a is a seventh schematic view illustrating the concrete structure of a pixel circuit provided by an embodiment of the invention.
Figure 5B:
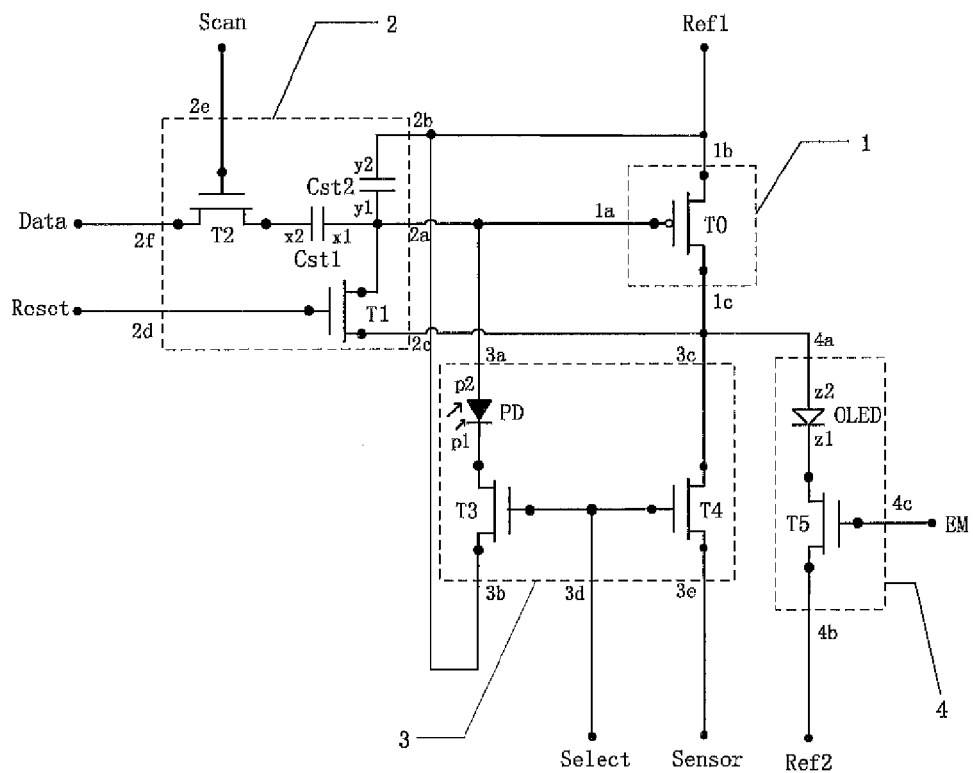
FIG. 5b is an eighth schematic view illustrating the concrete structure of a pixel circuit provided by an embodiment of the invention.

In the above touch detection sub-module 3, locations of the photodiode PD and the third transistor T3 are interchangeable. In order to ensure that the photodiode PD is in the state of being reversely biased upon work, when the drive transistor T0 is an N-type transistor, a cathode of the photodiode PD is connected to a drain electrode of the third switch transistor T3, and an anode of the photodiode PD is connected to a first reference signal terminal Ref1, as illustrated in FIG. 2a and FIG. 3a; or, the photodiode PD and the third transistor T3 swap places with each other, as illustrated in FIG. 2b and FIG. 3b, an anode of the photodiode PD is connected to a drain electrode of the third switch transistor T3, and a cathode of the photodiode PD is connected to a gate electrode of the drive transistor T0. When the drive transistor T0 is a P-type transistor, an anode of the photodiode PD is connected to a drain electrode of the third switch transistor T3, and a cathode of the photodiode PD is connected to a first reference signal terminal Ref1, as illustrated in FIG. 4a and FIG. 5a; or, the photodiode PD and the third transistor T3 swap places with each other, as illustrated in FIG. 4b and FIG. 5b, a cathode of the photodiode PD is connected to a drain electrode of the third switch transistor T3, and an anode of the photodiode PD is connected to a gate electrode of the drive transistor T0.

It is to be noted that, the photodiode PD can be turned on only when it is reversely biased and irradiated with light. The working principle of the photodiode PD is that, when the reversely biased photodiode PD is irradiated with light (namely, there is a touch on it), photo-induced carriers are generated by the photodiode PD as a result of photoelectric effect, so as to form a larger inverse current. The greater the light intensity irradiated onto the photodiode PD is, the larger the inverse current generated by the photodiode PD is.

For example, the third switch transistor T3 and the fourth switch transistor T4 may be N-type transistors, as illustrated in FIG. 2a, FIG. 2b, FIG. 5a and FIG. 5b; the third switch transistor T3 and the fourth switch transistor T4 may also be P-type transistors, as illustrated in FIG. 3a, FIG. 3b, FIG. 4a and FIG. 4b. No limitation will be made here.

For example, in the event that the third switch transistor T3 and the fourth switch transistor T4 are N-type transistors, when the signal of the touch control signal terminal Select is of high level, the third switch transistor T3 and the fourth switch transistor T4 are in a turned-on state; in the event that the third switch transistor T3 and the fourth switch transistor T4 are P-type transistors, when the signal of the touch control signal terminal Select is of low level, the third switch transistor T3 and the fourth switch transistor T4 are in a turned-on state.

For example, in the above pixel circuit provided by embodiments of the invention, the light-emitting control sub-module 4, as illustrated in FIG. 2a, FIG. 2b, FIG. 3a, FIG. 3b, FIG. 4a, FIG. 4b, FIG. 5a and FIG. 5b, may further include a fifth switch transistor T5 specifically.

A gate electrode of the fifth switch transistor T5 is connected to a light-emitting control signal terminal EM, a drain electrode of the fifth switch transistor T5 is connected to a first terminal z1 of the luminous device; and a source electrode of the fifth switch transistor T5 is connected to a third terminal 1c of the drive sub-module 1;

a second terminal z2 of the luminous device is connected to a second reference signal terminal Ref2, as illustrated in FIG. 2a, FIG. 3a, FIG. 4a and FIG. 5a, or, a source electrode of the fifth switch transistor T5 is connected to a second reference signal terminal Ref2; and a second terminal z2 of the luminous device is connected to a third terminal 1e of the drive sub-module 1, as illustrated in FIG. 2b, FIG. 3b, FIG. 4b and FIG. 5b.

For example, the luminous device in the above pixel circuit provided by embodiments of the invention is usually an organic light emitting diode (OLED). The luminous display is achieved by the luminous device under the action of an on-state current of the drive transistor T0.

For example, in the above light-emitting control sub-module 4, locations of the OLED and the fifth switch transistor T5 are interchangeable. In order to ensure that the OLED can give off light normally, when the drive transistor T0 is an N-type transistor, a cathode of the OLED is connected to a drain electrode of the fifth switch transistor T5, and an anode of the OLED is connected to a second reference signal terminal Ref2, as illustrated in FIG. 2a and FIG. 3a; or, the OLED and the fifth switch transistor T5 swap places with each other, as illustrated in FIG. 2b and FIG. 3b, an anode of the OLED is connected to a drain electrode of the fifth switch transistor T5, and a cathode of the OLED is connected to a third terminal 1c of the drive sub-module 1. When the drive transistor T0 is a P-type transistor, an anode of the OLED is connected to a drain electrode of the fifth switch transistor T5, and a cathode of the OLED is connected to a second reference signal terminal Ref2, as illustrated in FIG. 4a and FIG. 5a; or, the OLED and the fifth switch transistor T5 swap places with each other, as illustrated in FIG. 4b and FIG. 5b, a cathode of the OLED is connected to a drain electrode of the fifth switch transistor T5, and an anode of the OLED is connected to a third terminal 1 of the drive sub-module 1.

For example, the fifth switch transistor T5 may be an N-type transistor, as illustrated in FIG. 2a, FIG. 2b, FIG. 5a and FIG. 5b; the fifth switch transistor T5 may also be a P-type transistor, as illustrated in FIG. 3a, FIG. 3b, FIG. 4a and FIG. 4b. No limitation will be made here. In the event that the fifth switch transistor T5 is an N-type transistor, when the signal output from the light-emitting control signal terminal EM is of high level, the fifth switch transistor T5 is in a turned-on state; in the event that the fifth switch transistor T5 is a P-type transistor, when the signal output from the light-emitting control signal terminal EM is of low level, the fifth switch transistor T5 is in a turned-on state.

It is to be noted that, in the above pixel circuit provided by embodiments of the invention, the mentioned drive transistor and switch transistors may be thin film transistors (TFTs), and may also be metal oxide semiconductor transistors (MOS), no limit being set here. And, source electrodes and drain electrodes of these transistors may be interchanged, and no specific discrimination will be made.

The specific working principle of the above pixel circuit provided by embodiments of the invention will be described below in detail with the aid of several concrete examples. In the following examples, when the drive transistor T0 is an N-type transistor, the voltage value $V_{SS}$ of the first reference signal terminal Ref1 is smaller than or equal to 0, and the voltage value of the second reference signal terminal Ref2 is larger than 0; when the drive transistor T0 is a P-type transistor, the voltage value $V_{DD}$ of the first reference signal terminal Ref1 is larger than 0, and the voltage value $V_{SS}$ of the second reference signal terminal Ref2 is smaller than or equal to 0.

Example 1

Figure 2C:
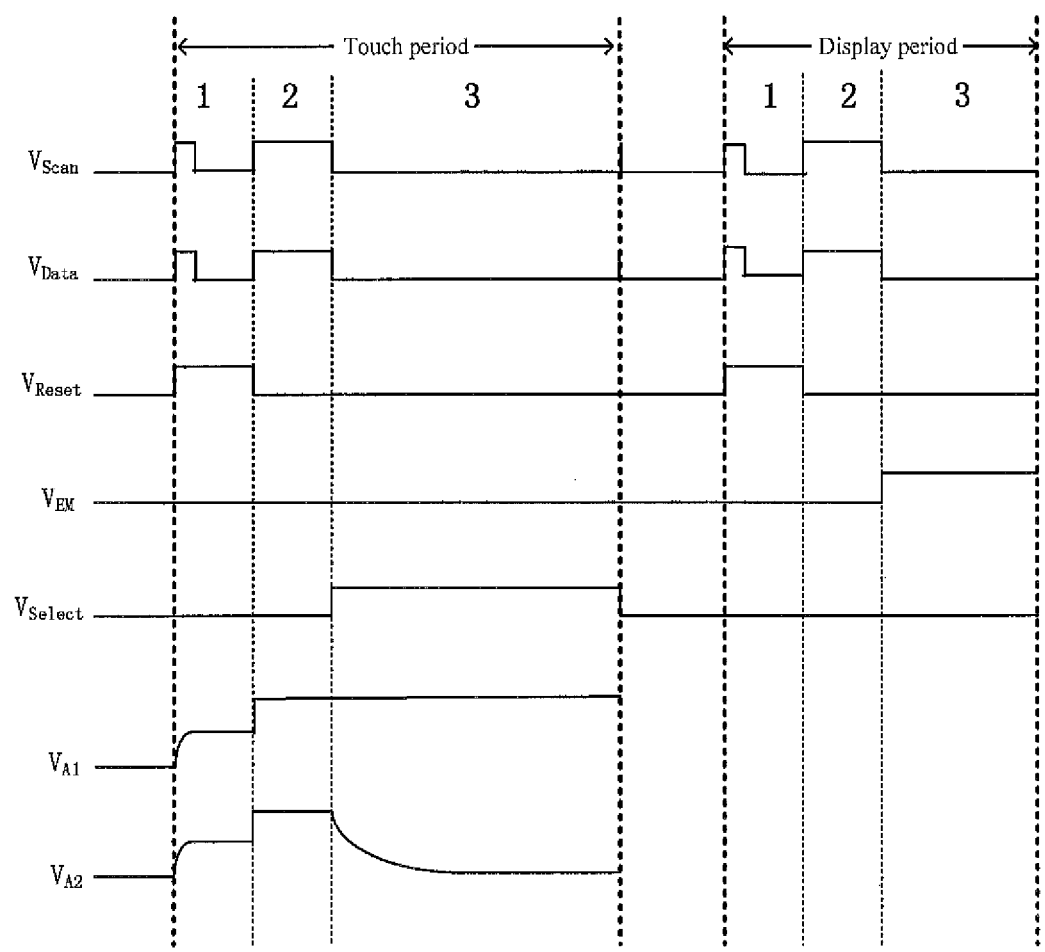
FIG. 2c is a first diagram illustrating the circuit timing of a pixel circuit provided by an embodiment of the invention.

As illustrated in FIG. 2a and FIG. 2b, the drive transistor T0 is an N-type transistor, and the first transistor T1, the second switch transistor T2, the third switch transistor T3, the fourth switch transistor T4 and the fifth switch transistor T5 are N-type transistors as well. FIG. 2c is a circuit timing diagram of FIG. 2a and FIG. 2b, in which, the voltage of the scan signal terminal Scan is $V_{Scan}$, the voltage of the data signal terminal Data is $V_{Data}$, the voltage of the reset signal terminal Reset is $V_{Reset}$, the voltage of the touch control signal terminal Select is $V_{Select}$, the voltage of the light-emitting control signal terminal EM is $V_{EM}$, the voltage of the gate electrode of the drive transistor T0 in the case of a touch is $V_{A1}$, and the voltage of the gate electrode of the drive transistor T0 in the case of no touch is $V_{A2}$.

The working principle of the pixel circuit is as follows.

For the initialization stage of the touch period (i.e. the first stage 1 of the touch period), during this, the voltage $V_{Reset}$ of the reset signal terminal Reset is at high level, the voltage $V_{Select}$ of the touch control signal terminal Select and the voltage $V_{EM}$ of the light-emitting control signal terminal EM are at low level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient high level to a low level, and at the same time, the voltage $V_{Data}$ of the data signal terminal and the voltage of the scan signal terminal are changed from a transient high level to a low level synchronously, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{SS}$. Meanwhile, the voltage $V_{SS}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{SS}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is in an initialized state. At this time, the photodiode PD is in a turned-off state, and whether there is a touch on the photodiode PD or not, gate voltages $V_{A1}$ and $V_{A2}$ of the drive transistor T0 are both $V_{SS}+V_{th}$.

For the data write stage of the touch period (i.e. the second stage 2 of the touch period), during this, voltage $V_{Scan}$ of the scan signal terminal Scan and voltage $V_{Data}$ of the data signal terminal Data are at high level, voltage $V_{Reset}$ of the reset signal terminal Reset, voltage $V_{Select}$ of the touch control signal terminal Select and voltage $V_{EM}$ of the light-emitting control signal terminal EM are at low level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 is $V_{SS}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{SS}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{SS}+V_{th}$, namely, data write-in is achieved at the gate electrode of the drive transistor T0. At this time, the photodiode PD is in a turned-off state, and whether there is a touch on the photodiode PD or not, gate voltages $V_{A1}$ and $V_{A2}$ of the drive transistor T0 are both $V_{Data}[C1/(C1+C2)]+V_{SS}+V_{th}$.

For the touch detection stage of the touch period (i.e. the third stage 3 of the touch period), during this, voltage $V_{Select}$ of the touch control signal terminal Select is at high level, voltage $V_{Reset}$ of the reset signal terminal Reset, voltage $V_{Scan}$ of the scan signal terminal Scan, voltage $V_{Data}$ of the data signal terminal Data and voltage $V_{EM}$ of the light-emitting control signal terminal EM are at low level, the third switch transistor T3 and the fourth switch transistor T4 are in a turned-on state, and the first switch transistor T1, the second switch transistor T2 and the fifth switch transistor T5 are in a turned-off state.

At this time, if the photodiode PD is not irradiated with light (namely, there is a touch on it), so that the photodiode PD is in a turned-off state, then the gate voltage $V_{A1}$ of the drive transistor T0 is still maintained at $V_{Data}[C1/(C1+C2)]+V_{SS}+V_{th}$, so that the drive transistor T0 is in a turned-on state. The voltage $V_{SS}$ of the first reference signal terminal Ref1 is input to a source electrode of the drive transistor T0, a touch detection signal is output through the drain electrode of the drive transistor T0, and the touch detection signal is further output to a touch signal read terminal Sensor via the switched-on fourth switch transistor T4.

At this time, if the photodiode PD is irradiated with light (namely, there is no touch on it), then photo-induced carriers are generated by the photodiode PD as a result of photoelectric effect. The formed inverse current causes charges on the first capacitor Cst1 and the second capacitor Cst2 to decrease, so that the gate voltage $V_{A2}$ input to the drive transistor T0 is reduced, and in turn, a touch detection signal that is output from the drive transistor T0 and is output to a touch signal read terminal Sensor via the fourth switch transistor T4 becomes small. The size of the touch detection signal is related to the light intensity irradiated onto the photodiode PD, and the greater the light intensity is, the smaller the touch detection signal is.

For the initialization stage of the display period (i.e. the first stage 1 of the display period), the voltage $V_{Reset}$ of the reset signal terminal Reset is at high level, the voltage $V_{Select}$ of the touch control signal terminal Select and the voltage $V_{EM}$ of the light-emitting control signal terminal EM are at low level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient high level to a low level, and at the same time, the voltage $V_{Data}$ of the data signal terminal Data is changed from a transient high level to a low level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{SS}$. Meanwhile, the voltage $V_{SS}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{SS}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state.

For the data write stage of the display period (i.e. the second stage 2 of the display period), during this, voltage $V_{Scan}$ of the scan signal terminal Scan and voltage $V_{Data}$ of the data signal terminal Data are at high level, voltage $V_{Reset}$ of the reset signal terminal Reset, voltage $V_{Select}$ of touch control signal terminal Select and voltage $V_{EM}$ of the light-emitting control signal terminal EM are at low level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 becomes $V_{SS}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{SS}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{SS}+V_{th}$, namely, data write-in is achieved at the gate electrode of the drive transistor T0.

For the light-emitting drive stage of the display period (i.e. the third stage 3 of the display period), during this, voltage $V_{EM}$ of the light-emitting control signal terminal EM is at high level, voltage $V_{Reset}$ of the reset signal terminal Reset, voltage $V_{Scan}$ of the scan signal terminal Scan, voltage $V_{Data}$ of the data signal terminal Data and voltage $V_{Select}$ of the touch control signal terminal Select are at low level, the first switch transistor T1, the second switch transistor T2, the third switch transistor T3 and the fourth switch transistor T4 are in a turned-off state, the fifth switch transistor T5 is in a turned-on state, and an OLED is turned on. The gate voltage of the drive transistor T0 is still maintained at $V_{Data}[C1/(C1+C2)]+V_{SS}+V_{th}$, and at this time, the voltage between the gate electrode and the source electrode of the drive transistor T0 is $V_{gs}=V_g-V_s=V_{Data}[C1/(C1+C2)]+V_{th}+V_{SS}-V_{SS}=V_{Data}[C1/(C1+C2)]+V_{th}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K\{V_{Data}[C1/(C1+C2)]+V_{th}-V_{th}\}^2=K\{V_{Data}[C1/(C1+C2)]\}^2$, where K is a structural parameter, and the value is relatively stable for same structures, so that it can be regarded as a constant. As can be seen from derivation of the formula, a drain current flowing through the drive transistor T0 is merely related to the voltage $V_{Data}$ of a data signal terminal and capacity values of the first capacitor Cst1 and the second capacitor Cst2, and has nothing to do with the threshold voltage $V_{th}$ of the drive transistor T0. Therefore, when the on-state current $i_d$ is useful for driving the luminous device to give off light, the current flowing through each OLED is relatively uniform. There is no such case where the threshold voltage $V_{th}$, is non-uniform owing to the rear panel manufacturing process and this leads to the fact that the current flowing through each OLED differs, resulting in uneven brightness.

In summary, when the above pixel circuit is at the touch period, in case that there is a touch on the photodiode PD, a touch sensing signal output from the touch signal read terminal Sensor is larger than a touch sensing signal output from the touch signal read terminal Sensor in case of no touch. Whether there is a touch on the touch panel or not can be determined by means of analyzing the size of a touch sensing signal output from the pixel circuit, and in turn, the position of a contact is determined, thereby realizing a touch detecting function. When the above pixel circuit is at the display period, by means of storing the threshold voltage $V_{th}$ of the drive transistor T0 on the second capacitor Cst2, it is ensured that the drive voltage for light emission of the OLED is related to voltage $V_{DATA}$ of a data signal, and has nothing to do with the threshold voltage $V_{th}$ of the drive transistor T0. Thus, an impact of threshold voltage $V_{th}$ on the OLED is avoided. That is, when the same data signal is employed to be applied to different pixel units, images with the same brightness can be obtained, thereby improving the uniformity of image brightness in a display region of the display device.

Example 2

Figure 3C:
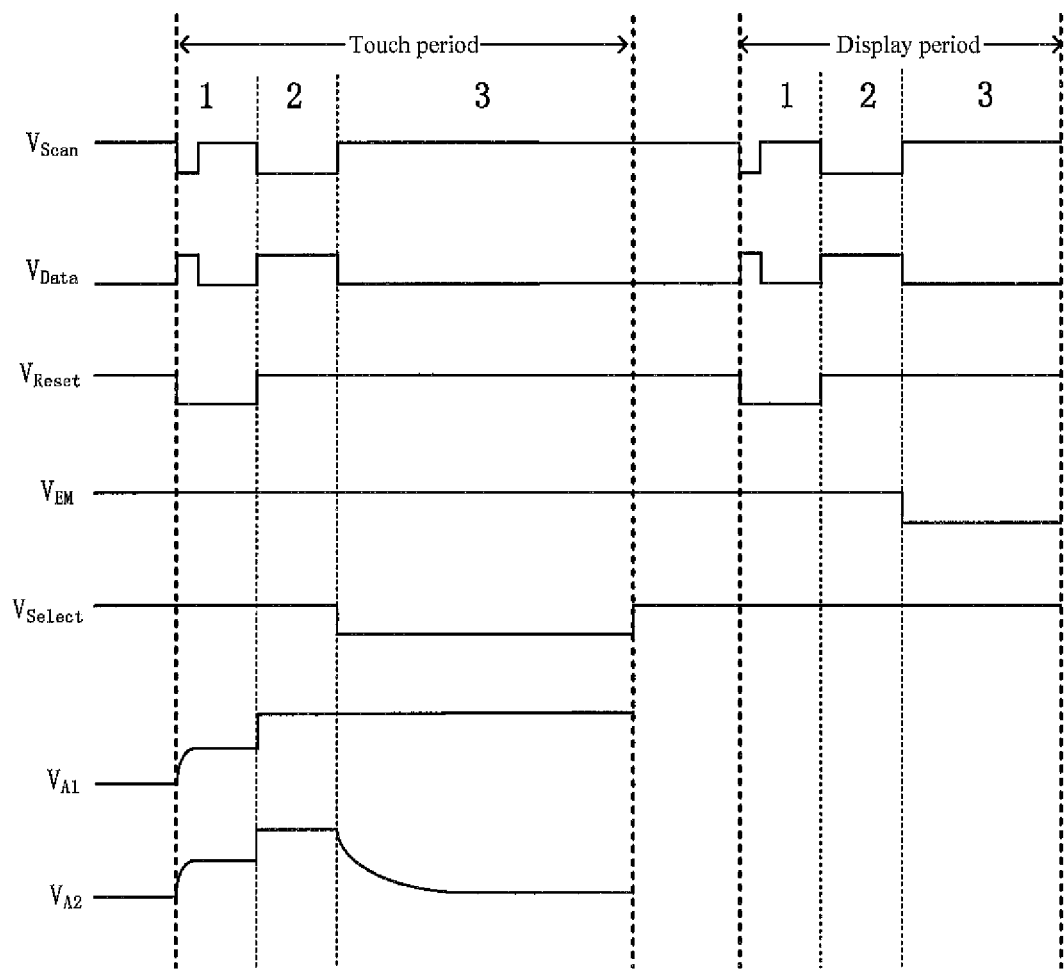
FIG. 3c is a second diagram illustrating the circuit timing of a pixel circuit provided by an embodiment of the invention.

As illustrated in FIG. 3a and FIG. 3b, the drive transistor T0 is an N-type transistor, and the first transistor T1, the second switch transistor T2, the third switch transistor T3, the fourth switch transistor T4 and the fifth switch transistor T5 are P-type transistors. FIG. 3c is a circuit timing diagram of FIG. 3a and FIG. 3b, in which, the voltage of the scan signal terminal Scan is $V_{Scan}$, the voltage of the data signal terminal Data is $V_{Data}$, the voltage of the reset signal terminal Reset is $V_{Reset}$, the voltage of the touch control signal terminal Select is $V_{Select}$, the voltage of the light-emitting control signal terminal EM is $V_{EM}$, the voltage of the gate electrode of the drive transistor T0 in the case of a touch is $V_{A1}$, and the voltage of the gate electrode of the drive transistor T0 in the case of no touch is $V_{A2}$.

The working principle of the pixel circuit is as follows.

For the initialization stage of the touch period (i.e. the first stage 1 of the touch period), during this, the voltage $V_{Reset}$ of the reset signal terminal Reset is at low level, the voltage $V_{Select}$ of the touch control signal terminal Select and the voltage $V_{EM}$ of the light-emitting control signal terminal EM are at high level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$, of the scan signal terminal Scan is changed from a transient low level to a high level, and at the same time, the voltage $V_{Data}$ of the data signal terminal Data is changed from a transient high level to a low level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{SS}$. Meanwhile, the voltage $V_{SS}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{SS}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state. At this time, the photodiode PD is in a turned-off state, and whether there is a touch on the photodiode PD or not, gate voltages $V_{A1}$ and $V_{A2}$ of the drive transistor T0 are both $V_{SS}+V_{th}$.

For the data write stage of the touch period (i.e. the second stage 2 of the touch period), during this, voltage $V_{Scan}$ of the scan signal terminal Scan is at low level, voltage $V_{Data}$ of the data signal terminal Data, voltage $V_{Reset}$ of the reset signal terminal Reset, voltage $V_{Select}$ of the touch control signal terminal Select and voltage $V_{EM}$ of the light-emitting control signal terminal EM are at high level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 becomes $V_{SS}$. A data signal. $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{SS}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{SS}+V_{th}$, namely, data write-in is achieved at the gate electrode of the drive transistor T0. In this stage, the photodiode PD is in a turned-off state, and whether there is a touch on the photodiode PD or not, gate voltages $V_{A1}$ and $V_{A2}$ of the drive transistor T0 are both $V_{Data}[C1/(C1+C2)]+V_{SS}+V_{th}$.

For the touch detection stage of the touch period (i.e. the third stage 3 of the touch period), during this, voltage $V_{Data}$ of the data signal terminal Data and voltage $V_{Select}$ of the touch control signal terminal Select are at low level, voltage $V_{Reset}$ of the reset signal terminal Reset, voltage $V_{Scan}$ of the scan signal terminal Scan, and voltage $V_{EM}$ of the light-emitting control signal terminal EM are at high level, the third switch transistor T3 and the fourth switch transistor T4 are in a turned-on state, and the first switch transistor T1, the second switch transistor T2 and the fifth switch transistor T5 are in a turned-off state.

At this time, if the photodiode PD is not irradiated with light (namely, there is a touch on it), so that the photodiode PD is in a turned-off state, then the gate voltage $V_{A1}$ of the drive transistor T0 is still maintained at $V_{Data}[C1/(C1+C2)]+V_{SS}+V_{th}$, so that the drive transistor T0 is in a turned-on state. The voltage $V_{SS}$ of the first reference signal terminal Ref1 is input to a source electrode of the drive transistor T0, a touch detection signal is output through the drain electrode of the drive transistor T0, and the touch detection signal is further output to a touch signal read terminal Sensor via the switched-on fourth switch transistor T4.

At this time, if the photodiode PD is irradiated with light (namely, there is no touch on it), then photo-induced carriers are generated by the photodiode PD as a result of photoelectric effect. The formed inverse current causes charges on the first capacitor Cst1 and the second capacitor Cst2 to decrease, so that the gate voltage $V_{A2}$ input to the drive transistor T0 is reduced, and in turn, a touch detection signal that is output from the drive transistor T0 and is output to a touch signal read terminal Sensor via the fourth switch transistor T4 becomes small. The size of the touch detection signal is related to the light intensity irradiated onto the photodiode PD, and the greater the light intensity is, the smaller the touch detection signal is.

For the initialization stage of the display period (i.e. the first stage 1 of the display period), during this, the voltage $V_{Reset}$ of the reset signal terminal Reset is at low level, the voltage $V_{Select}$ of the touch control signal terminal Select and the voltage $V_{EM}$ of the light-emitting control signal terminal EM are at high level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient low level to a high level, and at the same time, the voltage $V_{Data}$ of the data signal terminal Data is changed from a transient high level to a low level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{SS}$. Meanwhile, the voltage $V_{SS}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{SS}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state.

For the data write stage of the display period (i.e. the second stage 2 of the display period), during this, voltage $V_{Scan}$ of the scan signal terminal Scan is at low level, voltage $V_{Data}$ of the data signal terminal Data, voltage $V_{Reset}$ of the reset signal terminal Reset, voltage $V_{Select}$ of touch control signal terminal Select and voltage $V_{EM}$ of the light-emitting control signal terminal EM are at high level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 becomes $V_{SS}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{SS}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{SS}+V_{th}$, namely, data write-in is achieved at the gate electrode of the drive transistor T0.

For the light-emitting drive stage of the display period (i.e. the third stage 3 of the display period), during this, voltage $V_{Data}$ of the data signal terminal Data and voltage $V_{EM}$ of the light-emitting control signal terminal EM are at low level, voltage $V_{Reset}$ of the reset signal terminal Reset, voltage $V_{50}$ of the scan signal terminal Scan and voltage $V_{Select}$ of the touch control signal terminal Select are at high level, the first switch transistor T1, the second switch transistor T2, the third switch transistor T3 and the fourth switch transistor T4 are in a turned-off state, the fifth switch transistor T5 is in a turned-on state, and an OLED is turned on. The gate voltage of the drive transistor T0 is still maintained at $V_{Data}[C1/(C1+C2)]+V_{SS}+V_{th}$, and at this time, the voltage between the source electrode and the gate electrode of the drive transistor T0 is $V_{gs}=V_g-V_s=V_{Data}[C1/(C1+C2)]+V_{SS}+V_{th}-V_{SS}=V_{Data}[C1/(C1+C2)]+V_{th}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K\{V_{Data}[C1/(C1+C2)]+V_{th}-V_{th}\}^2=K\{V_{Data}[C1/(C1+C2)]\}^2$, where K is a structural parameter, and the value is relatively stable for same structures, so that it can be regarded as a constant. As can be seen from derivation of the formula, a drain current flowing through the drive transistor T0 is merely related to the voltage $V_{Data}$ of a data signal terminal and capacity values of the first capacitor Cst1 and the second capacitor Cst2, and has nothing to do with the threshold voltage $V_{th}$ of the drive transistor T0. Therefore, when the on-state current $i_d$ is used for driving the luminous device to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

In summary, when the above pixel circuit is at the touch period, in case that there is a touch on the photodiode PD, a touch sensing signal output from the touch signal read terminal Sensor is larger than a touch sensing signal output from the touch signal read terminal in the case of no touch. Whether there is a touch on the touch panel or not can be determined by means of analyzing the size of a touch sensing signal output from the pixel circuit, and in turn, the position of a contact is determined, thereby realizing a touch detecting function. When the above pixel circuit is at the display period, by means of storing the threshold voltage $V_{th}$ of the drive transistor T0 on the second capacitor Cst2, it is ensured that the drive voltage for light emission of the OLED is related to voltage $V_{DATA}$ of a data signal, and has nothing to do with the threshold voltage $V_{th}$ of the drive transistor T0. Thus, an impact of threshold voltage $V_{th}$ on the OLED is avoided. That is, when the same data signal is employed to be applied to different pixel units, images with the same brightness can be obtained, thereby improving the uniformity of image brightness in a display region of the display device.

Example 3

Figure 4C:
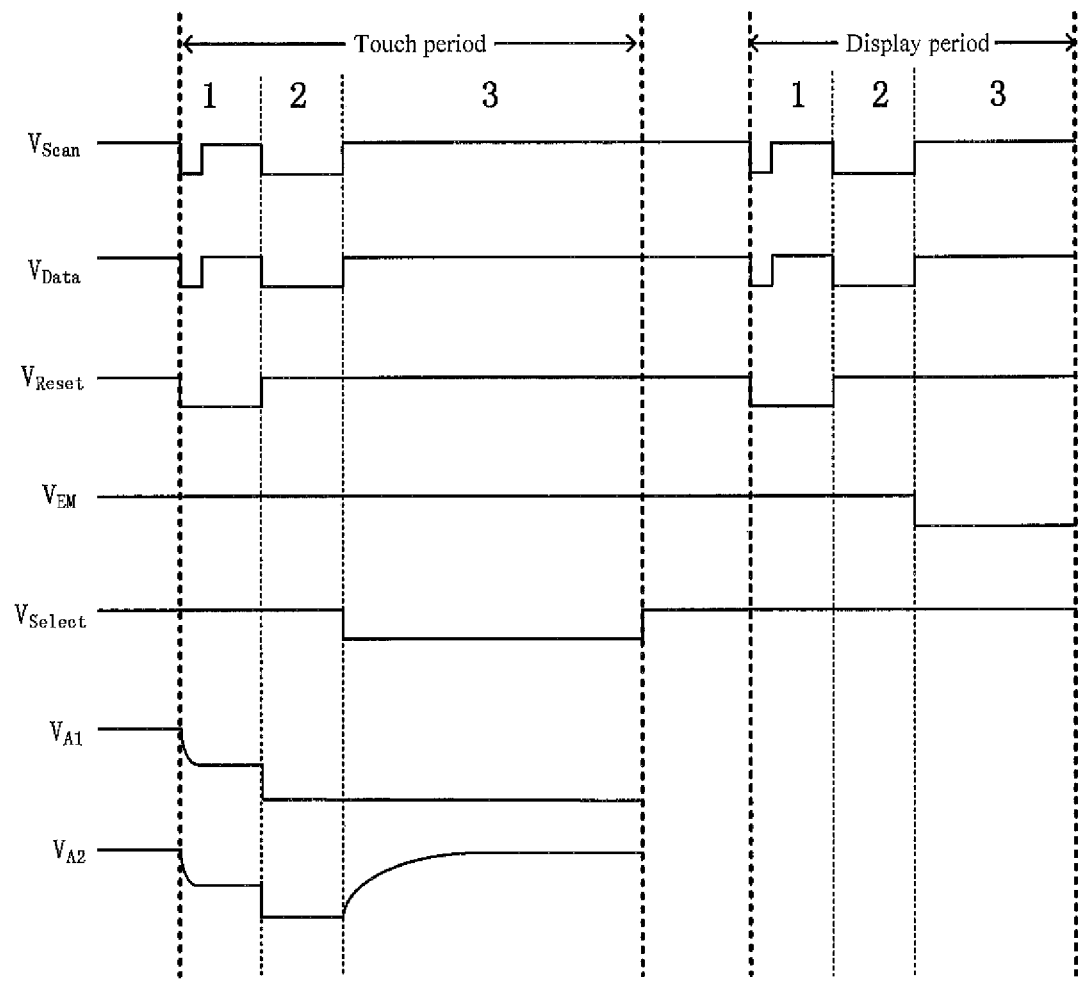
FIG. 4c is a third diagram illustrating the circuit timing of a pixel circuit provided by an embodiment of the invention.

As illustrated in FIG. 4a and FIG. 4b, the drive transistor T0 is a P-type transistor, and the first transistor T1, the second switch transistor T2, the third switch transistor T3, the fourth switch transistor T4 and the fifth switch transistor T5 are P-type transistors as well. FIG. 4c is a circuit timing diagram of FIG. 4a and FIG. 4b, in which, the voltage of the scan signal terminal Scan is $V_{Scan}$, the voltage of the data signal terminal Data is $V_{Data}$, the voltage of the reset signal terminal Reset is $V_{Reset}$, the voltage of the touch control signal terminal Select is $V_{Select}$, the voltage of the light-emitting control signal terminal EM is $V_{EM}$, the voltage of the gate electrode of the drive transistor T0 in the case of a touch is $V_{A1}$, and the voltage of the gate electrode of the drive transistor T0 in the case of no touch is $V_{A2}$.

The working principle of the pixel circuit is as follows.

For the initialization stage of the touch period (i.e. the first stage 1 of the touch period), during this, the voltage $V_{Reset}$ of the reset signal terminal Reset is at low level, the voltage $V_{Select}$ of the touch control signal terminal Select and the voltage $V_{EM}$ of the light-emitting control signal terminal EM are at high level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient low level to a high level, and at the same time, the voltage $V_{Data}$ of the data signal terminal Data is changed from a transient low level to a high level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{DD}$. Meanwhile, the voltage $V_{DD}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{DD}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state. At this time, the photodiode PD is in a turned-off state, and whether there is a touch on the photodiode PD or not, gate voltages $V_{A1}$ and $V_{A2}$ of the drive transistor T0 are both $V_{DD}+V_{th}$.

For the data write stage of the touch period (i.e. the second stage 2 of the touch period), during this, voltage $V_{Scan}$ of the scan signal terminal Scan and voltage $V_{Data}$ of the data signal terminal Data are at low level, voltage $V_{Reset}$ of the reset signal terminal Reset, voltage $V_{Select}$ of the touch control signal terminal Select and voltage $V_{EM}$ of the light-emitting control signal terminal EM are at high level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 is $V_{DD}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{DD}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{DD}+V_{th}$, namely, data write-in is achieved at the gate electrode of the drive transistor T0. In this stage, the photodiode PD is in a turned-off state, and whether there is a touch on the photodiode PD or not, gate voltages $V_{A1}$ and $V_{A2}$ of the drive transistor T0 are both $V_{Data}[C1/(C1+C2)]+V_{DD}+V_{th}$.

For the touch detection stage of the touch period (i.e. the third stage 3 of the touch period), during this, voltage $V_{Select}$ of the touch control signal terminal Select is at low level, voltage $V_{Reset}$ of the reset signal terminal Reset, voltage $V_{Scan}$ of the scan signal terminal Scan, voltage $V_{Data}$ of the data signal terminal Data and voltage $V_{EM}$ of the light-emitting control signal terminal EM are at high level, the third switch transistor T3 and the fourth switch transistor T4 are in a turned-on state, and the first switch transistor T1, the second switch transistor T2 and the fifth switch transistor T5 are in a turned-off state.

At this time, if the photodiode PD is not irradiated with light (namely, there is a touch on it), so that the photodiode PD is in a turned-off state, then the gate voltage $V_{A1}$ of the drive transistor T0 is still maintained at $V_{Data}[C1/(C1+C2)]+V_{DD}+V_{th}$, so that the drive transistor T0 is in a turned-on state. The voltage $V_{DD}$ of the first reference signal terminal Ref1 is input to a source electrode of the drive transistor T0, a touch detection signal is output through the drain electrode of the drive transistor T0, and the touch detection signal is further output to a touch signal read terminal Sensor via the switched-on fourth switch transistor T4.

At this time, if the photodiode PD is irradiated with light (namely, there is no touch on it), then photo-induced carriers are generated by the photodiode PD as a result of photoelectric effect. The formed inverse current causes charges on the first capacitor Cst1 and the second capacitor Cst2 to increase, so that the gate voltage $V_{A2}$ input to the drive transistor T0 is raised, and in turn, a touch detection signal that is output from the drive transistor T0 and is output to a touch signal read terminal Sensor via the fourth switch transistor T4 becomes small. The size of the touch detection signal is related to the light intensity irradiated onto the photodiode PD, and the greater the light intensity is, the smaller the touch detection signal is.

For the initialization stage of the display period (i.e. the first stage 1 of the display period), during this, the voltage $V_{Reset}$ of the reset signal terminal Reset is at low level, the voltage $V_{select}$ of the touch control signal terminal Select and the voltage $V_{EM}$ of the light-emitting control signal terminal EM are at high level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient low level to a high level, and at the same time, the voltage $V_{Data}$ of the data signal terminal Data is changed from a transient low level to a high level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{DD}$. Meanwhile, the voltage $V_{DD}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{DD}+V_{th}$ by charge. Wherein, the threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state.

For the data write stage of the display period (i.e. the second stage 2 of the display period), during this, voltage $V_{Scan}$ of the scan signal terminal Scan and voltage $V_{Data}$ of the data signal terminal Data are at low level, voltage $V_{Reset}$ of the reset signal terminal Reset, voltage $V_{Select}$ of touch control signal terminal Select and voltage $V_{EM}$ of the light-emitting control signal terminal EM are at high level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 becomes $V_{DD}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{DD}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{DD}+V_{th}$, namely, data write-in is achieved at the gate electrode of the drive transistor T0.

For the light-emitting drive stage of the display period (i.e. the third stage 3 of the display period), during this, voltage $V_{EM}$ of the light-emitting control signal terminal EM is at low level, voltage $V_{Reset}$ of the reset signal terminal Reset, voltage $V_{Scan}$ of the scan signal terminal Scan, voltage $V_{Data}$ of the data signal terminal Data and voltage $V_{Select}$ of the touch control signal terminal Select are at high level, the first switch transistor T1, the second switch transistor T2, the third switch transistor T3 and the fourth switch transistor T4 are in a turned-off state, the fifth switch transistor T5 is in a turned-on state, and an OLED is turned on. The gate voltage of the drive transistor T0 is still maintained at $V_{Data}[C1/(C1+C2)]+V_{DD}+V_{th}$, and at this time, the voltage between the source electrode and the gate electrode of the drive transistor T0 is $V_{gs}=V_g-V_s=V_{Data}[C1/(C1+C2)]+V_{DD}+V_{th}-V_{DD}=V_{Data}[C1/(C1+C2)]+V_{th}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K\{V_{Data}[C1/(C1+C2)]+V_{th}-V_{th}\}^2=K\{V_{Data}[C1/(C1+C2)]\}^2$, where K is a structural parameter, and the value is relatively stable for same structures, so that it can be regarded as a constant. As can be seen from derivation of the formula, a drain current flowing through the drive transistor T0 is merely related to the voltage $V_{Data}$ of a data signal terminal and capacity values of the first capacitor Cst1 and the second capacitor Cst2, and has nothing to do with the threshold voltage $V_{th}$ of the drive transistor T0. Therefore, when the on-state current $i_d$ is useful for driving the luminous device to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

In summary, when the above pixel circuit is over the touch period, in case that there is a touch on the photodiode PD, a touch sensing signal output from the touch signal read terminal Sensor is larger than a touch sensing signal output from the touch signal read terminal Sensor in the case of no touch. Whether there is a touch on the touch panel or not can be determined by means of analyzing the size of a touch sensing signal output from the pixel circuit, and in turn, the position of a contact is determined, thereby realizing a touch detecting function. When the above pixel circuit is over the display period, by means of storing the threshold voltage $V_{th}$ of the drive transistor T0 on the second capacitor Cst2, it is ensured that the drive voltage for light emission of the OLED is related to voltage $V_{DATA}$ of a data signal, and has nothing to do with the threshold voltage $V_{th}$ of the drive transistor T0. Thus, an impact of threshold voltage $V_{th}$ on the OLED is avoided. That is, when the same data signal is employed to be applied to different pixel units, images with the same brightness can be obtained, thereby improving the uniformity of image brightness in a display region of the display device.

Example 4

Figure 5C:
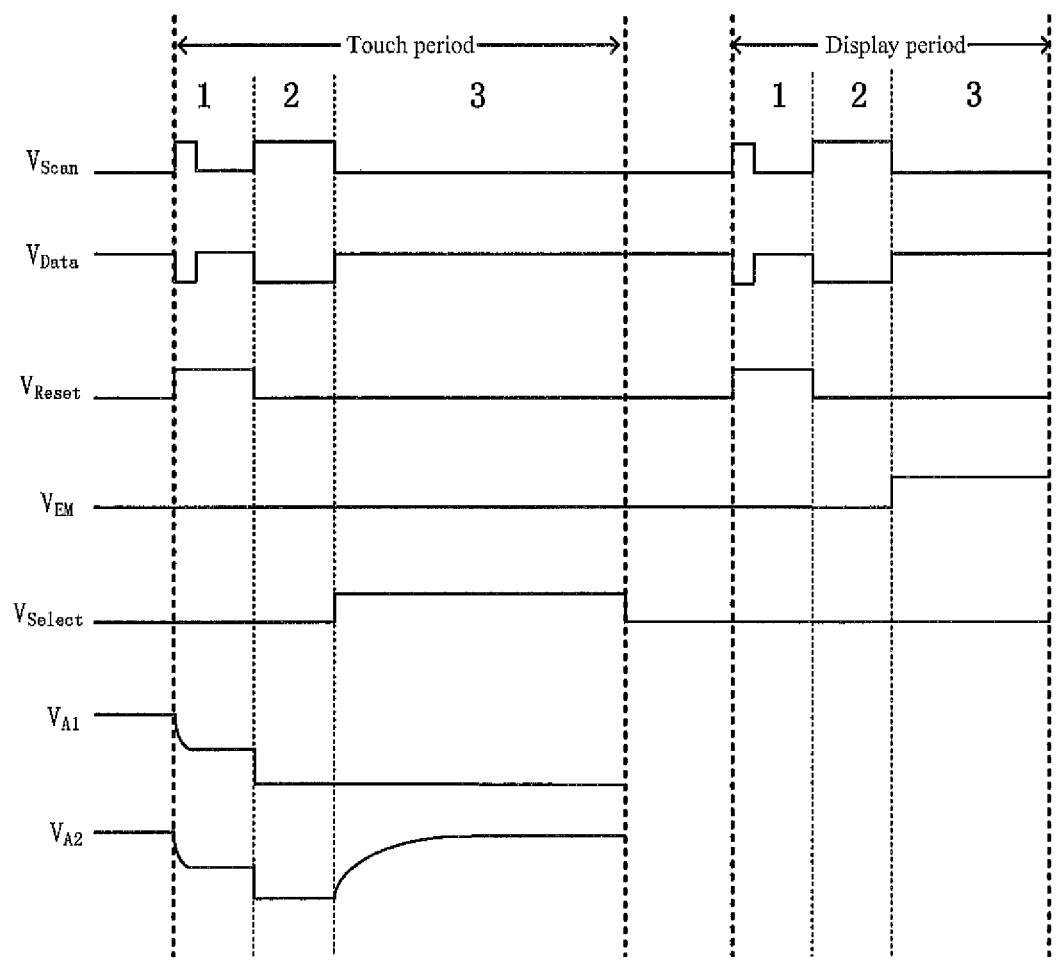
FIG. 5c is a fourth diagram illustrating the circuit timing of a pixel circuit provided by an embodiment of the invention.

As illustrated in FIG. 5a and FIG. 5b, the drive transistor T0 is a P-type transistor, and the first transistor T1, the second switch transistor T2, the third switch transistor T3, the fourth switch transistor T4 and the fifth switch transistor T5 are N-type transistors. FIG. 5c is a circuit timing diagram of FIG. 5a and FIG. 5b, in which, the voltage of the scan signal terminal Scan is $V_{scan}$, the voltage of the data signal terminal Data is $V_{Data}$, the voltage of the reset signal terminal Reset is $V_{Reset}$, the voltage of the touch control signal terminal Select is $V_{Select}$, the voltage of the light-emitting control signal terminal EM is $V_{EM}$, the voltage of the gate electrode of the drive transistor T0 in the case of a touch is $V_{A1}$, and the voltage of the gate electrode of the drive transistor T0 in the case of no touch is $V_{A2}$.

The working principle of the pixel circuit is as follows.

For the initialization stage of the touch period (i.e. the first stage 1 of the touch period), during this, the voltage $V_{Reset}$ of the reset signal terminal Reset is at high level, the voltage $V_{Select}$ of the touch control signal terminal Select and the voltage $V_{EM}$ of the light-emitting control signal terminal EM are at low level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient high level to a low level, and at the same time, the voltage $V_{Data}$ of the data signal terminal Data is changed from a transient low level to a high level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 becomes $V_{DD}$. Meanwhile, the voltage $V_{DD}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{DD}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state. At this time, the photodiode PD is in a turned-off state, and whether there is a touch on the photodiode PD or not, gate voltages $V_{A1}$ and $V_{A2}$ of the drive transistor T0 are both $V_{DD}+V_{th}$.

For the data write stage of the touch period (i.e. the second stage 2 of the touch period), during this, voltage $V_{Scan}$ of the scan signal terminal Scan is at high level, voltage $V_{Data}$ of the data signal terminal Data, voltage $V_{Reset}$ of the reset signal terminal Reset, voltage $V_{Select}$ of the touch control signal terminal Select and voltage $V_{EM}$ of the light-emitting control signal terminal EM are at low level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 becomes $V_{DD}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{DD}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{DD}+V_{th}$, namely, data write-in is achieved at the gate electrode of the drive transistor T0. In this stage, the photodiode PD is in a turned-off state, and whether there is a touch on the photodiode PD or not, gate voltages $V_{A1}$ and $V_{A2}$ of the drive transistor T0 are both $V_{Data}[C1/(C1+C2)]+V_{DD}+V_{th}$.

For the touch detection stage of the touch period (i.e. the third stage 3 of the touch period), during this, voltage $V_{Data}$ of the data signal terminal Data and voltage $V_{Select}$ of the touch control signal terminal Select are at high level, voltage $V_{Reset}$ of the reset signal terminal Reset, voltage $V_{Scan}$ of the scan signal terminal Scan, and voltage $V_{EM}$ of the light-emitting control signal'terminal EM are at low level, the third switch transistor T3 and the fourth switch transistor T4 are in a turned-on state, and the first switch transistor T1, the second switch transistor T2 and the fifth switch transistor T5 are in a turned-off state.

At this time, if the photodiode PD is not irradiated with light (namely, there is a touch on it), so that the photodiode PD is in a turned-off state, then the gate voltage $V_{A1}$ of the drive transistor T0 is still maintained at $V_{Data}[C1/(C1+C2)]+V_{DD}+V_{th}$, so that the drive transistor T0 is in a turned-on state. The voltage $V_{DD}$ of the first reference signal terminal Ref1 is input to a source electrode of the drive transistor T0, a touch detection signal is output through the drain electrode of the drive transistor T0, and the touch detection signal is further output to a touch signal read terminal Sensor via the switched-on fourth switch transistor T4.

At this time, if the photodiode PD is irradiated with light (namely, there is no touch on it), then photo-induced carriers are generated by the photodiode PD as a result of photo-electric effect. The formed inverse current causes charges on the first capacitor Cst1 and the second capacitor Cst2 to increase, so that the gate voltage $V_{A2}$ input to the drive transistor T0 is raised, and in turn, a touch detection signal that is output from the drive transistor T0 and is output to a touch signal read terminal Sensor via the fourth switch transistor T4 becomes small. The size of the touch detection signal is related to the light intensity irradiated onto the photodiode PD, and the greater the light intensity is, the smaller the touch detection signal is.

For the initialization stage of the display period (i.e. the first stage 1 of the display period), during this, the voltage $V_{Reset}$ of the reset signal terminal Reset is at high level, the voltage $V_{Select}$ of the touch control signal terminal Select and the voltage $V_{EM}$ of the light-emitting control signal terminal EM are at low level, the first switch transistor T1 is in a turned-on state, the third switch transistor T3, the fourth switch transistor T4 and the fifth switch transistor T5 are in a turned-off state. The switched-on first switch transistor T1 causes the drive transistor T0 to become the connecting manner of a diode. The voltage $V_{Scan}$ of the scan signal terminal Scan is changed from a transient high level to a low level, and at the same time, the voltage $V_{Data}$ of the data signal terminal Data is changed from a transient low level to a high level as synchronized with the voltage of the scan signal terminal, so that the drive transistor T0 that has become the connecting manner of a diode is turned on. At this time, a second end y2 of the second capacitor Cst2 is directly connected to the first reference signal terminal Ref1, and the voltage of the second end y2 of the second capacitor Cst2 is $V_{DD}$. Meanwhile, the voltage $V_{DD}$ of the first reference signal terminal Ref1 starts to charge the second capacitor Cst2 via the drive transistor T0 and the first switch transistor T1, and the drive transistor T0 is turned off when the voltage value $V_A$ of a first end y1 of the second capacitor Cst2 becomes $V_{DD}+V_{th}$ by charge. The threshold voltage of the drive transistor T0 is $V_{th}$, and at this moment, the voltage difference across the second capacitor Cst2 is $V_{th}$, thereby achieving storage of the threshold voltage of the drive transistor T0 at the first end y1 of the second capacitor Cst2. Thus, the data write sub-module 2 is enabled to be in an initialized state.

For the data write stage of the display period (i.e. the second stage 2 of the display period), during this, voltage $V_{Scan}$ of the scan signal terminal Scan is at high level, voltage $V_{Data}$ of the data signal terminal Data, voltage $V_{Reset}$ of the reset signal terminal Reset, voltage $V_{Select}$ of touch control signal terminal Select and voltage $V_{EM}$ of the light-emitting control signal terminal EM are at low level, the second switch transistor T2 is in a turned-on state, the first switch transistor T1, the third switch transistor T3, the fourth switch transistor T4 and the fifth switch transistor T5 are in a turned-off state. The second end y2 of the second capacitor Cst2 is directly connected to a first reference signal terminal Ref1, and the voltage of the second end y2 of the second capacitor Cst2 becomes $V_{DD}$. A data signal $V_{Data}$ output from the data signal terminal Data is written into a second end x2 of the first capacitor Cst1 connected to a drain electrode of the second switch transistor T2 via its source electrode, so that the voltage of the second end x2 of the first capacitor Cst1 becomes $V_{Data}$, and at this moment, a coupling voltage at the junction of the first capacitor Cst1 and the second capacitor Cst2 (namely, at the first end y1 of the second capacitor Cst2) is $V_{Data}[C1/(C1+C2)]+V_{DD}+V_{th}$, wherein, C1 and C2 are capacity values of the first capacitor Cst1 and the second capacitor Cst2, respectively. The first end y1 of the second capacitor C2 is connected to a gate electrode of the drive transistor T0, and voltage of the gate electrode of the drive transistor T0 is also $V_{Data}[C1/(C1+C2)]+V_{DD}+V_{th}$, namely, data write-in is achieved at the gate electrode of the drive transistor T0.

For the light-emitting drive stage of the display period (i.e. the third stage 3 of the display period), during this, voltage $V_{Data}$ of the data signal terminal Data and voltage $V_{EM}$ of the light-emitting control signal terminal EM are at high level, voltage $V_{Reset}$ of the reset signal terminal Reset, voltage $V_{scan}$ of the scan signal terminal Scan and voltage $V_{Select}$ of the touch control signal terminal Select are at low level, the first switch transistor T1, the second switch transistor T2, the third switch transistor T3 and the fourth switch transistor T4 are in a turned-off state, the fifth switch transistor T5 is in a turned-on state, and an OLED is turned on. The gate voltage of the drive transistor T0 is still maintained at $V_{Data}[C1/(C+C2)]+V_{DD}+V_{th}$, and at this time, the voltage between the source electrode and the gate electrode of the drive transistor T0 is $V_{gs}=V_g-V_s=V_{Data}[C1/(C1+C2)]+V_{DD}+V_{th}-V_{DD}=V_{Data}[C1/(C1+C2)]+V_{th}$.

As the drive transistor T0 operates in a saturated state, it can be known according to current characteristics in the saturated state that, the on-state current $i_d$ of the drive transistor T0 satisfies the formula: $i_d=K(V_{gs}-V_{th})^2=K\{V_{Data}[C1/(C1+C2)]+V_{th}-V_{th}\}^2=\{(V_{Data}[C1+C2)]\}^2$, where K is a structural parameter, and the value is relatively stable for same structures, so that it can be regarded as a constant. As can be seen from derivation of the formula, a drain current flowing through the drive transistor T0 is merely related to the voltage $V_{Data}$ of a data signal terminal and capacity values of the first capacitor Cst1 and the second capacitor Cst2, and has nothing to do with the threshold voltage $V_{th}$ of the drive transistor T0. Therefore, when the on-state current $i_d$ is used for driving the luminous device to give off light, the current flowing through each OLED is relatively uniform. There is no such case where the threshold voltage $V_{th}$ is non-uniform owing to the rear panel manufacturing process and this leads to the fact that the current flowing through each OLED differs, resulting in uneven brightness.

In summary, when the above pixel circuit is over the touch period, in case that there is a touch on the photodiode PD, a touch sensing signal output from the touch signal read terminal Sensor is larger than a touch sensing signal output from the touch signal read terminal in the case of no touch. Whether there is a touch on the touch panel or not can be determined by means of analyzing the size of a touch sensing signal output from the pixel circuit, and in turn, the position of a contact is determined, thereby realizing a touch detecting function. When the above pixel circuit is over the display period, by means of storing the threshold voltage $V_{th}$ of the drive transistor T0 on the second capacitor Cst2, it is ensured that the drive voltage for light emission of the OLED is related to voltage $V_{DATA}$ of a data signal, and has nothing to do with the threshold voltage $V_{th}$ of the drive transistor T0. Thus, an impact of threshold voltage $V_{th}$ on the OLED is avoided. That is, when the same data signal is employed to be applied to different pixel units, images with the same brightness can be obtained, thereby improving the uniformity of image brightness in a display region of the display device.

Based on the same inventive concept, an organic electroluminescent display panel comprising the above pixel circuit provided by embodiments of the invention is further provided by an embodiment of the invention. As the principle to solve problems of the organic electroluminescent display panel is similar to that of one of the aforementioned pixel circuits, for implementation of the organic electroluminescent display panel, reference can be made to implementation of the pixel circuit, and repetitions are omitted here.

Based on the same inventive concept, a display device comprising the above organic electroluminescent display panel provided by the embodiment of the invention is further provided by an embodiment of the invention. The display device may be a display, a cell phone, a television, a notebook, an all-in-one machine, or the like. As for other constituent parts requisite to the display device, it should be understood by those ordinarily skilled in the art that each is provided therein, and they will not be described any more here, and should not be construed as limitative of the invention, either.

With respect to a pixel circuit, an organic electroluminescent display panel and a display device provided by embodiments of the invention, the pixel circuit comprises a drive sub-module, a data write sub-module, a touch detection sub-module having a photosensitive device and a light-emitting control sub-module having a luminous device; wherein, under the control of the reset signal terminal, the scan signal terminal and the data signal terminal, a data signal is transmitted to the first terminal of the drive sub-module by the data write sub-module; under the control of the touch control signal terminal, the touch detection sub-module controls output of a touch detection signal from the drive sub-module to the touch signal read terminal, the touch detection signal being decreased as the light intensity irradiated onto the photosensitive device is increased, so as to realize a touch detecting function; under the control of the light-emitting control signal terminal, the light-emitting control sub-module controls the drive sub-module to drive the luminous device to give off light, so as to realize a display driving function. Touch and display functions are integrated in the pixel circuit, so that the production cost involved in arranging a display driving circuit and a touch circuit separately can be saved, and thickness of the display panel can be thinned as well.

Descriptions made above are merely exemplary embodiments of the invention, but are not used to limit the protection scope of the invention. The protection scope of the invention is determined by attached claims.

This application claims the benefit of priority from Chinese patent application No. 201310329847.X, filed on Jul. 31, 2013, the disclosure of which is incorporated herein in its entirety by reference as a part of the present application.

The invention claimed is:

1. A pixel circuit, comprising: a drive sub-module, a data write sub-module, a touch detection sub-module having a photosensitive device, and a light-emitting control sub-module having a luminous device, wherein,
   a first terminal of the drive sub-module is connected to a first terminal of the data write sub-module and a first terminal of the touch detection sub-module, respectively, a second terminal of the drive sub-module is connected to a second terminal of the data write sub-module, a second terminal of the touch detection sub-module and a first reference signal terminal, respectively, a third terminal of the drive sub-module is connected to a third terminal of the data write sub-module, a third terminal of the touch detection sub-module and a first terminal of the light-emitting control sub-module, respectively;
   a fourth terminal of the data write sub-module is connected to a reset signal terminal, a fifth terminal of the data write sub-module is connected to a scan signal terminal, a sixth terminal of the data write sub-module is connected to a data signal terminal; under the control of the reset signal terminal, the scan signal terminal and the data signal terminal, a data signal is transmitted to the first terminal of the drive sub-module by the data write sub-module;
   a fourth terminal of the touch detection sub-module is connected to a touch control signal terminal, a fifth terminal of the touch detection sub-module is connected to a touch signal read terminal; under the control of the touch control signal terminal, the touch detection sub-module controls output of a touch detection signal from the drive sub-module to the touch signal read terminal, the touch detection signal being decreased as the light intensity irradiated onto the photosensitive device is increased;
   a second terminal of the light-emitting control sub-module is connected to a second reference signal terminal, a third terminal of the light-emitting control sub-module is connected to a light-emitting control signal terminal; under the control of the light-emitting control signal terminal, the light-emitting control sub-module controls the drive sub-module to drive the luminous device to give off light,
   wherein, the data write sub-module comprises a first switch transistor, a second switch transistor, a first capacitor and a second capacitor,
   wherein, a gate electrode of the first switch transistor is connected to the reset signal terminal, a source electrode of the first switch transistor is connected to the third terminal of the drive sub-module, and a drain electrode of the first switch transistor is connected to the first terminal of the drive sub-module, a first end of the first capacitor and a first end of the second capacitor, respectively;

a gate electrode of the second switch transistor is connected to the scan signal terminal, a source electrode of the second switch transistor is connected to the data signal terminal, and a drain electrode of the second switch transistor is connected to a second end of the first capacitor;

a second end of the second capacitor is connected to the first reference signal terminal, the second terminal of the drive sub-module and the second terminal of the touch detection sub-module, respectively.

2. The pixel circuit according to claim 1, wherein, the first terminal and the second terminal of the drive sub-module are signal input terminals, and the third terminal of the drive sub-module is a signal output terminal;

the first terminal of the data write sub-module is a signal output terminal, the second terminal, the third terminal, the fourth terminal, the fifth terminal and the sixth terminal of the data write sub-module are signal input terminals;

one of the first terminal and the second terminal of the touch detection sub-module is a signal input terminal, the other one of the first terminal and the second terminal of the touch detection sub-module is a signal output terminal; the third terminal and the fourth terminal of the touch detection sub-module are signal input terminals, the fifth terminal of the touch detection sub-module is a signal output terminal;

one of the first terminal and the second terminal of the light-emitting control sub-module is a signal input terminal, the other one of the first terminal and the second terminal of the light-emitting control sub-module is a signal output terminal; the third terminal of the light-emitting control sub-module is a signal input terminal.

3. The pixel circuit according to claim 2, wherein, the drive sub-module comprises a drive transistor, a gate electrode of which is the first terminal of the drive sub-module, a source electrode of which is the second terminal of the drive sub-module, and a drain electrode of which is the third terminal of the drive sub-module.

4. The pixel circuit according to claim 3, wherein, the drive transistor is an N-type transistor, the voltage of the first reference signal terminal is a zero voltage or a negative voltage, and the voltage of the second reference signal terminal is a positive voltage; or the drive transistor is a P-type transistor, the voltage of the first reference signal terminal is a positive voltage, and the voltage of the second reference signal terminal is a negative voltage or a zero voltage.

5. The pixel circuit according to claim 2, wherein, the touch detection sub-module comprises a third switch transistor and a fourth switch transistor, wherein, a gate electrode of the third switch transistor is connected to the touch control signal terminal, a drain electrode of the third switch transistor is connected to a first end of the photosensitive device;

one of a source electrode of the third switch transistor and a second terminal of the photosensitive device is connected to the first terminal of the drive sub-module, and the other one of the source electrode of the third switch transistor and the second terminal of the photosensitive device is connected to the first reference signal terminal;

a gate electrode of the fourth switch transistor is connected to the touch control signal terminal, a source electrode of the fourth switch transistor is connected to the third terminal of the drive sub-module, and a drain electrode of the fourth switch transistor is connected to the touch signal read terminal.

6. The pixel circuit according to claim 2, wherein, the light-emitting control sub-module comprises a fifth switch transistor, wherein, a gate electrode of the fifth switch transistor is connected to the light-emitting control signal terminal, and a drain electrode of the fifth switch transistor is connected to a first terminal of the luminous device;

one of a source electrode of the fifth switch transistor and a second terminal of the luminous device is connected to the third terminal of the drive sub-module, and the other one of the source electrode of the fifth switch transistor and the second terminal of the luminous device is connected to the second reference signal terminal.

7. The pixel circuit according to claim 1, wherein, the first switch transistor is an N-type transistor or a P-type transistor; the second switch transistor is an N-type transistor or a P-type transistor.

8. The pixel circuit according to claim 1, wherein, the touch detection sub-module comprises a third switch transistor and a fourth switch transistor, wherein, a gate electrode of the third switch transistor is connected to the touch control signal terminal, a drain electrode of the third switch transistor is connected to a first end of the photosensitive device;

one of a source electrode of the third switch transistor and a second terminal of the photosensitive device is connected to the first terminal of the drive sub-module, and the other one of the source electrode of the third switch transistor and the second terminal of the photosensitive device is connected to the first reference signal terminal;

a gate electrode of the fourth switch transistor is connected to the touch control signal terminal, a source electrode of the fourth switch transistor is connected to the third terminal of the drive sub-module, and a drain electrode of the fourth switch transistor is connected to the touch signal read terminal.

9. The pixel circuit according to claim 8, wherein, the third switch transistor and the fourth switch transistor are N-type transistors; or, the third switch transistor and the fourth switch transistor are P-type transistors.

10. The pixel circuit according to claim 1, wherein, the light-emitting control sub-module comprises a fifth switch transistor, wherein, a gate electrode of the fifth switch transistor is connected to the light-emitting control signal terminal, and a drain electrode of the fifth switch transistor is connected to a first terminal of the luminous device;

one of a source electrode of the fifth switch transistor and a second terminal of the luminous device is connected to the third terminal of the drive sub-module, and the other one of the source electrode of the fifth switch transistor and the second terminal of the luminous device is connected to the second reference signal terminal.

11. The pixel circuit according to claim 10, wherein, the fifth switch transistor is an N-type transistor or a P-type transistor.

12. An organic electroluminescent display panel, comprising the pixel circuit according to claim 1.

13. A display device, comprising the organic electroluminescent display panel according to claim 12.

14. The organic electroluminescent display panel according to claim 12, wherein, the first terminal and the second terminal of the drive sub-module are signal input terminals, and the third terminal of the drive sub-module is a signal output terminal;

the first terminal of the data write sub-module is a signal output terminal, the second terminal, the third terminal, the fourth terminal, the fifth terminal and the sixth terminal of the data write sub-module are signal input terminals;

one of the first terminal and the second terminal of the touch detection sub-module is a signal input terminal, the other one of the first terminal and the second terminal of the touch detection sub-module is a signal output terminal; the third terminal and the fourth terminal of the touch detection sub-module are signal input terminals, the fifth terminal of the touch detection sub-module is a signal output terminal;

one of the first terminal and the second terminal of the light-emitting control sub-module is a signal input terminal, the other one of the first terminal and the second terminal of the light-emitting control sub-module is a signal output terminal; the third terminal of the light-emitting control sub-module is a signal input terminal.

15. The organic electroluminescent display panel according to claim 14, wherein, the drive sub-module comprises a drive transistor, a gate electrode of which is the first terminal of the drive sub-module, a source electrode of which is the second terminal of the drive sub-module, and a drain electrode of which is the third terminal of the drive sub-module.

16. The organic electroluminescent display panel according to claim 15, wherein, the drive transistor is an N-type transistor, the voltage of the first reference signal terminal is a zero voltage or a negative voltage, and the voltage of the second reference signal terminal is a positive voltage; or the drive transistor is a P-type transistor, the voltage of the first reference signal terminal is a positive voltage, and the voltage of the second reference signal terminal is a negative voltage or a zero voltage.

17. The organic electroluminescent display panel according to claim 12, wherein, the first switch transistor is an N-type transistor or a P-type transistor; the second switch transistor is an N-type transistor or a P-type transistor.

\* \* \* \* \*